US007521090B1

(12) United States Patent
Cheng et al.

(10) Patent No.: US 7,521,090 B1
(45) Date of Patent: *Apr. 21, 2009

(54) METHOD OF USE OF EPOXY-CONTAINING CYCLOALIPHATIC ACRYLIC POLYMERS AS ORIENTATION CONTROL LAYERS FOR BLOCK COPOLYMER THIN FILMS

(75) Inventors: Joy Cheng, San Jose, CA (US);
Ho-Cheol Kim, San Jose, CA (US);
Charles T. Rettner, San Jose, CA (US);
Daniel P. Sanders, San Jose, CA (US);
Ratnam Sooriyakumaran, San Jose, CA (US); Linda Sundberg, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/060,500

(22) Filed: Apr. 1, 2008

Related U.S. Application Data

(63) Continuation of application No. 12/013,444, filed on Jan. 12, 2008.

(51) Int. Cl.
*B05D 5/00* (2006.01)
(52) U.S. Cl. ............... 427/256; 430/280.1; 427/258
(58) Field of Classification Search ............ 427/256, 427/258; 430/280.1
See application file for complete search history.

(56) References Cited

U.S. PATENT DOCUMENTS 6,106,998 A    8/2000  Maeda et al.

| 6,352,813 | B2 | 3/2002 | Nakano et al. |
| 6,746,825 | B2 | 6/2004 | Nealey et al. |
| 6,926,953 | B2 | 8/2005 | Nealey et al. |
| 2001/0021482 | A1 | 9/2001 | Nakano et al. |
| 2003/0091752 | A1 | 5/2003 | Nealey et al. |
| 2003/0118800 | A1 | 6/2003 | Thomas et al. |
| 2004/0175628 | A1 | 9/2004 | Nealey et al. |
| 2006/0078681 | A1 | 4/2006 | Hieda et al. |
| 2006/0134556 | A1 | 6/2006 | Nealey et al. |
| 2006/0249784 | A1 | 11/2006 | Black et al. |

(Continued)

OTHER PUBLICATIONS

R. Allen et al., "High Speed, Aqueous Developing Negative Resist Based on Triflic Acid Catalysed Epoxy Polymerization", Advances ins Resist Technology and Processing IX, 1992, pp. 513-525, vol. 1672.

(Continued)

*Primary Examiner*—Roberts P Culbert
(74) *Attorney, Agent, or Firm*—Cantor Colburn LLP

(57) ABSTRACT

Disclosed herein is a method of controlling the orientation of microphase-separated domains in a block copolymer film, comprising forming an orientation control layer comprising an epoxy-containing cycloaliphatic acrylic polymer on a surface of a substrate, irradiating and/or heating the substrate to crosslink the orientation control layer, and forming a block copolymer assembly layer comprising block copolymers which form microphase-separated domains, on a surface of the orientation control layer opposite the substrate. The orientation control layer can be selectively cross-linked to expose regions of the substrate, or the orientation control layer can be patterned without removing the layer, to provide selective patterning on the orientation control layer. In further embodiments, bilayer and trilayer imaging schemes are disclosed.

25 Claims, 11 Drawing Sheets

Lamellae/ Underlayer/ Au

Cylinders/ Underlayer/ Pt

| | La | Cy |
|---|---|---|
| | 2% | 1% |
| Substrate | 10min | 10min |
| Au | ⊥ | ⊥ |
| Pt | ⊥ | ⊥ |
| TiSix | ⊥ | ⊥ |
| SiNx | ⊥ | ⊥ |

U.S. PATENT DOCUMENTS

2007/0175859 A1  8/2007 Black et al.

OTHER PUBLICATIONS

P. Mansky et al., "Controlling Polymer-Surface Interactions with Random Copolymer Brushes", Science Mar. 7, 1997, pp. 1458-1460, vol. 275.

R. Peters et al., "Using Self-Assembled Monolayers Exposed to X-rays To Control the Wetting Behavior of Thin Films of Diblock Copolymers" Langmuir 2000, Feb. 18, 2000, pp. 4625-4631, American Chemical Society.

C. Park et al., "Enabling Nanotechnology with self assembled block copolymer patterns", Polymer, Jul. 29, 2003, pp. 6725-6760, 0032-3861, Elsevier.

D. Ryu et al., "A Generalized Approach to the Modification of Solid Surfaces", Science Apr. 8, 2005, pp. 236-239.

Ian Manners, "Synthetic metal-containing polymer" Wiley-VCH, 2004, (As referred to in the Specification as filed on p. 14, paragraph [0040]).

H. Ito, "Chemical Amplification Resists for Microlithography", Adv. Polym Sci, 2005, 37-245, DOI 10, 1007/B97574.

E. Freer et al., "Oriented Mesoporous Organosilicate Thin Films", NANO Letters 2005 Aug. 2, 2005, pp. 2014-2018, vol. 5, No. 10, American Chemical Society.

Applied Physics Newsletter, [online]; [retrieved on Jan. 21, 2008]; retrieved from the internet http://apl.aip.org/apl.copyright.jsp C.T. Black, "Self-aligned self assembly of multi-nanowire silicon field effect transistors", Applied Physics Letters, Oct. 13, 2005, 3p, vol. 87, 163116, American Institute of Physics.

I. In et al., "Side-Chain-Grafted Random Copolymer Brushes as Neutral Surfaces for Controlling the Orientation of Block Copolymer Microdomains in Thin Films". Langmuir, Jun. 8, 2006, pp. 7855-7860, 10.1021/la060478g, American Chemical Society.

Harvard University, [online]; [retrieved on Jun. 11, 2008]; retrieved from the Internet http://adsabs.harvard.edu/abs/2007APS.. MARN17003H J. Han et al., "Adsorption and Fractionation of RAFT-Polymerized PS-b-PMMA Block Copolymers for 2D Liquid Chromatography, "America Physical Society, APS March Meeting Abstract, Mar. 5-9, 2007, 2p.

J. Chai et al., "Assembly of Aligned Linear Metallic Patterns on Silicon", Nature Nanotechnology Aug. 3, 2007, pp. 500-506, vol. 2, Nature Publishing Group.

E. Han et al., "Photopatternable Imaging Layers for Controlling Block Copolymer Microdomain Orientation**", Advanced Material, Nov. 21, 2007, pp. 4448-4452, vol. 19. Wiley-VCH Verlag GmBH & Co., Weinheim.

J. Bang et al., "Facile Routes To Patterned Surface Neutralization Layers for Block Copolymer Lithography" Advanced Materials, Nov. 28, 2007, pp. 4552-4557vol. 19, Wiley-VCH Verlag GmBH & Co., Weinheimt al.

T.R. Albrecht, "Nanoimprint Lithography for Patterned Media", IEEE Lithography Workshop, Dec. 9-14, 2007, Rio Grande, Puerto Rico.

P. Nealey et al., "Directed Assembly of Triblock Copolymers" Patent Application, 48pgs, Beyer Weaver & Thomas, LLP, Oakland, CA, USA.

P. Nealey, "Methods and Compositions for Forming Patterns With Isolated or Discrete Features Using Block Copolymer Materials", Patent Application, 76pgs, Beyer Weaver & Thomas, LLP, Oakland, CA USA.

Parallel Lamellae
No Surface Patterns

Perpendicular Lamellae
Line Patterns

METHOD OF USE OF EPOXY-CONTAINING CYCLOALIPHATIC ACRYLIC POLYMERS AS ORIENTATION CONTROL LAYERS FOR BLOCK COPOLYMER THIN FILMS

CROSS-REFERENCE TO RELATED APPLICATIONS

This application is a continuation application of the following co-pending application, which is assigned to the same assignee as this application, International Business Machines Corporation of Armonk, N.Y. The below listed application is hereby incorporated herein by reference in its entirety: U.S. patent application Ser. No. 12/013,444, filed Jan. 12, 2008.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The invention relates to methods of use of orientation control compositions to impart controlled orientation of microdomains in films of block copolymers subsequently disposed on the orientation control layer.

2. Description of Background

Block copolymers are well known self-assembly systems, which form periodic microphase-separated domains (also referred to herein as both "microdomains" and "domains") to minimize total free energy. Thin films of block copolymers provide spatial chemical contrast at the nanometer-scale (FIG. 1A) and, therefore, they have been used as an alternative low-cost nanopatterning material for generating periodic nanoscale structures. For example, lamellar forming block copolymers can align their domains either parallel (FIG. 1B) or perpendicularly (FIG. 1C) to the surface of a substrate surface. The perpendicularly oriented lamellae provide nanoscale line patterns, while there is no surface pattern created by parallel oriented lamellae. Where lamellae form parallel to the plane of the substrate, one lamellar phase forms a first layer at the surface of the substrate (in the x-y plane of the substrate), and another lamellar phase forms an overlying parallel layer on the first layer, so that no lateral patterns of microdomains and no lateral chemical contrast form when viewing the film along the perpendicular (z) axis. When lamellae form perpendicular to the surface, the perpendicularly oriented lamellae provide nanoscale line patterns. Therefore, to form a useful pattern, control of the orientation of the self-assembled microdomains in the block copolymer is necessary. Without external orientation control, thin films of block copolymers tend to self-organize into randomly oriented nanostructures (FIG. 1D) or undesired morphologies, which are of no use for nanopatterning because of the random nature of the features.

Orientation of block copolymer microdomains can been obtained by guiding the self-assembly process with an external orientation biasing method such as by use of a mechanical flow field, electric field, temperature gradient, or by the influence of surface interaction by use of a surface modification layer, with the layer of block copolymer. Of these, use of a surface modification layer for orientation control is relatively straightforward to integrate into a spin-casting or other film-forming manufacturing process, and is therefore desirable. Random copolymer brushes, thermally cross-linked random copolymers, and self-assembled monolayers have each been used as the basis of an orientation control layer to induce preferential orientation in block copolymer thin films.

While surface modification methods can be readily integrated into manufacturing processes, each has limits to its utility. Polymer brushes are difficult to tune to the desired thickness and surface energy, and require reactive precursors. Additional rinse steps are often required to remove non-bound material. The composition of random copolymer brush layers must be tuned precisely to afford a neutral surface. This can be achieved by randomly copolymerizing two monomers, for example the same monomers used in a block copolymer of interest, in a precise ratio. However, many otherwise useful block copolymers (i.e., those that can form microdomains) exist for which it is unfeasible to synthesize random copolymers of repeating units of each block, for example because of different required polymerization mechanisms. End-group functionalization of polymers, or copolymerization with a third functionalized monomer, have been used to provide grafting sites. However, grafting efficiency is typically poor, requires impractically long annealing times, and is compatible with only a limited range of substrates [See e.g., P. Mansky, Y. Liu, E. Huang, T. P. Russell, C. Hawker, "Controlling polymer surface interaction with random copolymer brushes", *Science,* 275, 1458, (1997).] Thermally crosslinkable underlayers based on, for example, vinyl benzocyclobutene has been found to resolve some of these issues, but often require extended thermal cure steps. [See e.g., Du Yeol Ryu, Kyusoon Shin, Eric Drockenmuller Craig J. Hawker, and Thomas P. Russell "A generalized approach to modification of solid surfaces" *Science,* 308, 236, (2005)]. Photopatternable underlayers based on random copolymers of the monomers of the block copolymer with an appropriate functional monomer, for example, monomers having azide, glycidyl or acryloyl groups, have been used but provide relatively low cross-linking efficiency (as measured by lengthy exposure times and/or lengthy bake/anneal steps) and can further require an extra rinse step to remove non-crosslinked materials. [See e.g., Joona Bang, Joonwon Bae, Peter Löwenhielm, Christian Spiessberger, Susan A. Given-Beck, Thomas P. Russell, and Craig J. Hawker, "Facile routes to patterned surface neutralization layers for block copolymer lithography", *Advanced Materials,* vol. 19, p. 4552 (2007); Eungnak Han, Insik In, Sang-Min Park, Young-Hye La, Yao Wang, Paul F. Nealey, and Padma Gopalan, "Photopatternable imaging layers for controlling block copolymer microdomain orientation", *Advanced Materials,* vol. 19, pp. 4448 (2007) (epoxy groups in underlayers)].

SUMMARY OF THE INVENTION

The shortcomings of the prior art are overcome and additional advantages are provided through the provision of an orientation control layer. The orientation control layer is crosslinkable with moderate bake temperatures or irradiation in less than two minutes, and is further compatible with a wide variety of substrates.

In an embodiment, a method of controlling the orientation of microphase-separated domains in a block copolymer film comprises (a) forming an orientation control layer comprising an epoxy-containing cycloaliphatic acrylic polymer over a surface of a substrate, (b) irradiating and/or heating to crosslink the orientation control layer, (c) forming a block copolymer assembly layer comprising block copolymers which form microphase-separated domains upon forming the block copolymer assembly layer, on a surface of the orientation control layer opposite the substrate, and (d) removing at least one microphase-separated domain to generate a topographical pattern.

In another embodiment, a method of controlling the orientation of microphase-separated domains in specific areas of a substrate coated with a block copolymer film, comprises (a) forming an orientation control layer comprising an epoxy-containing cycloaliphatic acrylic polymer over a surface of a substrate, (b) exposing the orientation control layer pattern-wise with actinic radiation, EUV, or electron beam, to form a pattern of exposed and unexposed regions of the orientation control layer, (c) heating the substrate to crosslink the orientation control layer in the exposed regions, (d) removing uncrosslinked orientation control layer material in the unexposed regions with a solvent to uncover the surface of the substrate in the unexposed regions, (e) optionally, heating the substrate having the patterned crosslinked orientation control layer to remove residual solvent, (f) forming a block copolymer assembly layer comprising block copolymers that form microphase-separated domains, on a surface of the patterned crosslinked orientation control layer opposite the substrate, and (g) optionally annealing the substrate to induce pattern formation in the block copolymer layer, wherein lamellae form perpendicular to the plane of the substrate over the crosslinked orientation control layer, and wherein the lamellae form parallel to the plane of the substrate over the uncovered surface of the substrate.

In another embodiment, a method of controlling the orientation of microphase-separated domains and the directional alignment of the microphase-separated domains in a block copolymer film, comprises (a) forming an orientation control layer comprising an epoxy-containing cycloaliphatic acrylic polymer over a surface of a substrate, (b) heating to crosslink the orientation control layer, (c) optionally, rinsing the orientation control layer with a solvent, (d) optionally, heating the substrate to remove residual solvent, (e) exposing the orientation control layer pattern-wise with actinic radiation, EUV, x-ray, or electron beam, to form a pattern of exposed and unexposed regions of the orientation control layer, (f) optionally, rinsing the patterned orientation control layer with a solvent, (g) optionally, heating the substrate having the patterned orientation control layer to remove residual solvent, (h) forming a block copolymer assembly layer comprising a block copolymer having at least one block that forms microphase-separated, domains on a surface of the patterned orientation control layer opposite the substrate, and (i) annealing the substrate to induce microphase-separated domains to form a pattern in the block copolymer layer; wherein the microphase-separated domains are lamellae, and wherein when a pitch of the pattern in the patterned orientation control layer is at least 200% larger than the pitch of lamellae, the lamellae form parallel to the plane of the substrate over the exposed region of the patterned orientation control layer, and form perpendicular to the plane of the substrate on the unexposed region of patterned orientation control layer.

In another embodiment, a method of controlling the orientation of microphase-separated domains and the directional alignment of the microphase-separated domains in a block copolymer film comprises (a) forming an orientation control layer comprising an epoxy-containing cycloaliphatic acrylic polymer over a surface of a substrate., (b) heating the substrate to cross link the orientation control layer, (c) optionally, rinsing the orientation control layer with a solvent, (d) optionally, heating the substrate to remove residual solvent, (e) exposing the orientation control layer pattern wise with actinic radiation, EUV, x-ray, or electron beam, to form a pattern of exposed and unexposed regions of the orientation control layer, (f) optionally, rinsing the patterned orientation control layer with a solvent, (g) optionally, heating the substrate having the patterned orientation control layer to remove residual solvent, (h) forming a block copolymer assembly layer comprising a block copolymer having at least one block that forms microphase-separated domains on a surface of the patterned orientation control layer opposite the substrate, and (i) annealing the substrate to induce microphase-separated domains to form a pattern in the block copolymer layer; wherein the microphase-separated domains are lamellae, and wherein when a pitch of the pattern in the patterned orientation control layer is about the same as a pitch of the pattern in the block copolymer layer, the exposed region is preferentially wetted by one domain of the block copolymer and the unexposed region is wetted by the other domain(s) of block copolymer, and the block copolymer forms a spatial replica of the underlying patterned orientation control layer.

In further embodiments, at least one microphase-separated domain is selectively removed to generate a topographical pattern, followed by pattern transfer from the topographic pattern to the substrate by a reactive ion etch process. In still further embodiments, bilayer and trilayer imaging schemes comprising the above method are disclosed.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have identified compositions and methods that are useful in forming an orientation control layer at the surface of a substrate that can provide orientation control of microdomains in a block copolymer layer disposed thereon. The methods as disclosed allow for formation of self-assembling preparation of nanoscale structural features, and directional control of the nanopatterned features, by sequential deposition of the orientation control layer using conventional solution coating techniques, providing greater control of the desired feature patterns, integrability into different post-patterning processes useful for obtaining different topographies by substrate etch, and thereby obtaining reduced processing and cycle time in the fabrication of such structures, and for the preparation of a wide variety of features in a wide variety of compositional or topographic substrates.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1A:
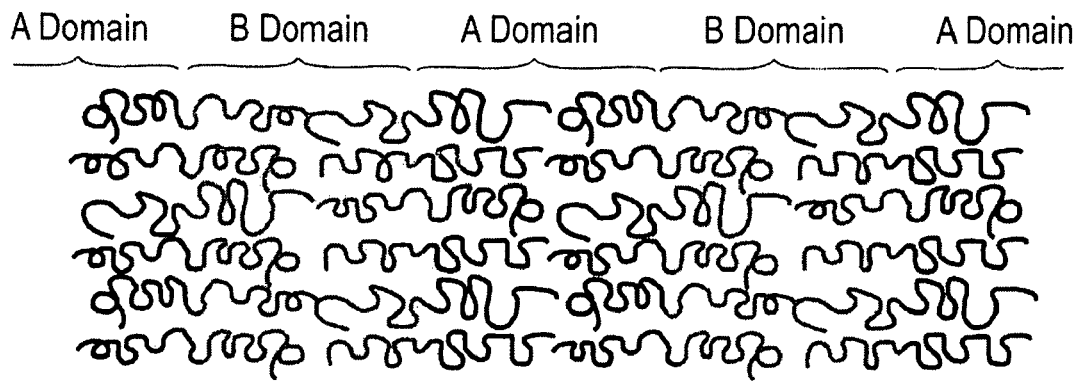
FIG. 1 illustrates schematic representations of: (A) lamellae-forming block copolymers in which domains of different blocks are depicted; (B) a block copolymer thin film with lamellar domains oriented parallel to the substrate, (C) a block copolymer thin film with lamellae domains oriented perpendicular to the substrates; (D) an atomic force microscopy (AFM) image of an exemplary lamellae-forming poly (styrene-b-methyl methacrylate) (abbreviated "PS-b-PMMA") film formed on a silicon substrate without orientation control.
Figure 1B:
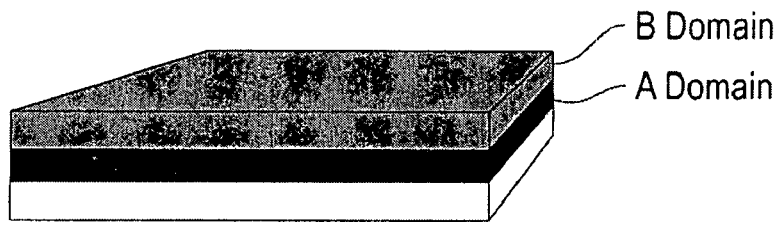
Figure 1C:
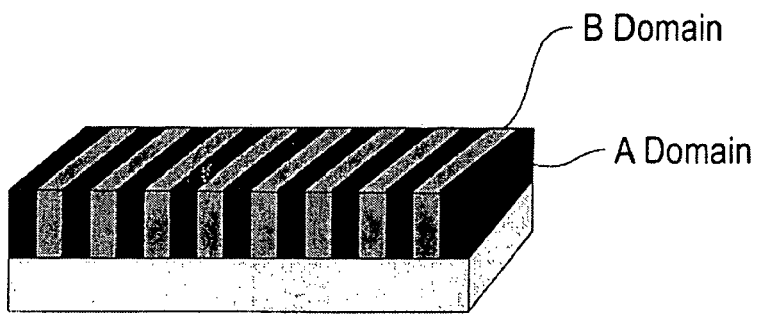
Figure 1D:
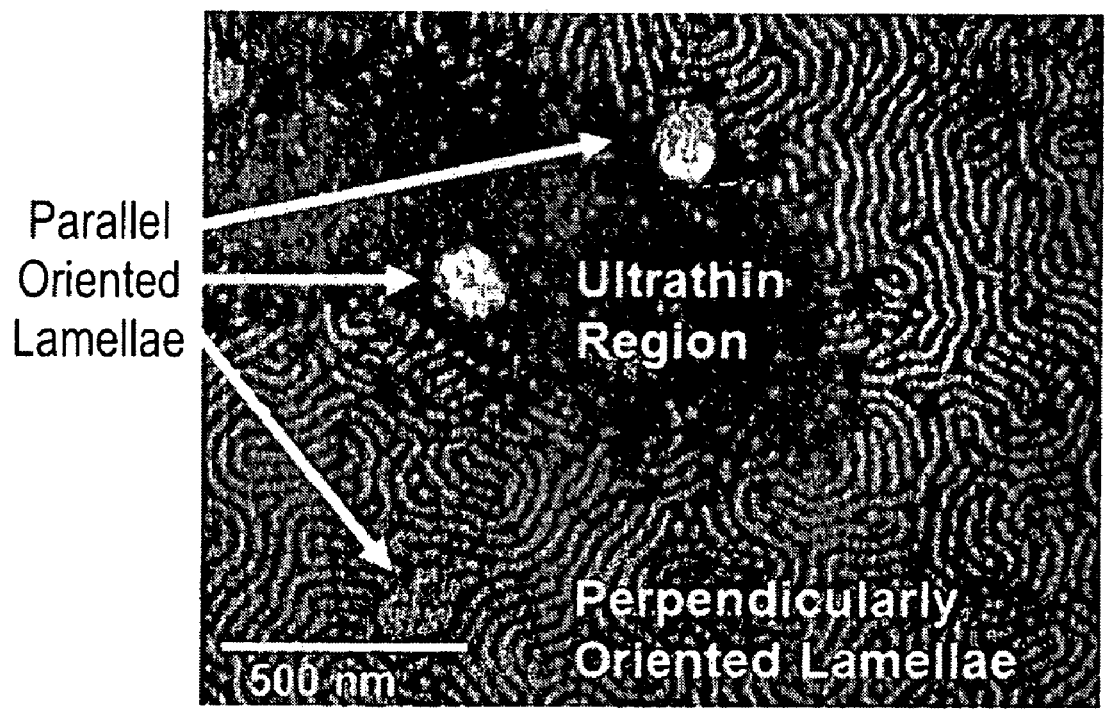

The detailed description explains the preferred embodiments of the invention, together with advantages and features, by way of example with reference to the drawings.

DETAILED DESCRIPTION OF THE INVENTION

Disclosed herein is a method for generating a film of a crosslinked orientation control layer from an epoxy-based crosslinkable orientation control material that is compatible with a wide variety of surfaces, and methods for controlling the orientation of microdomains formed in a layer comprising microdomain-forming block copolymers disposed on the crosslinked orientation control layer. The composition comprises epoxy-containing cycloaliphatic acrylic polymers, such as poly(styrene-ran-epoxydicyclopentadienyl methacrylate), that can be tuned to provide neutral surfaces for block copolymers. The orientation control materials can desirably crosslink during subsequent processing while forming the orientation control layer.

Unexpectedly, it has been found that the orientation control materials, when coated on a substrate in a film-forming process, provide a crosslinked orientation control layer having a neutral surface energy that can be tuned to be compatible with a variety of microdomain-forming layers comprising the block copolymer. To this end, the orientation control layer can be adjusted compositionally for use and compatibility with a wide variety of substrates, and with a wide variety of microdomain-forming block copolymers or block copolymer compositions, making the orientation control material useful in a number of different processes for patterning a substrate. (i) In an embodiment, the orientation control layer can be patterned to uncover the underlying substrate in the unexposed regions of the pattern and thereby to provide different orientation (e.g., parallel or perpendicular) of microdomains in block copolymers formed over these regions. (ii) In another embodiment, the orientation control layer can have patterns imaged thereon which effect a chemical change in the exposed regions of the imaged pattern, the pattern having a pitch about the same of the pitch of the block copolymer, so that nanostructures in the block copolymer align on the patterned orientation control layer, with one block copolymer domain aligned to the exposed region and the other aligned to the unexposed region. (iii) In another embodiment, a bilayer imaging system is contemplated. (iv) In yet another embodiment, a trilayer imaging system is contemplated.

As used herein, "phase-separate" refers to the propensity of the blocks of the block copolymers to form discrete microphase-separated domains, also referred to as "microdomains" and also simply as "domains". The blocks of the same monomer aggregate to form periodic domains, and the spacing and morphology of domains depends on the interaction and volume fraction among different blocks in the block copolymer. Domains of block copolymers can form during applying, such as during a spin-casting step, during a heating step, or can be tuned by an annealing step. "Heating", also referred to herein as "baking", is a general process wherein the temperature of the substrate and coated layers thereon is raised above ambient temperature. "Annealing" can include thermal annealing, thermal gradient annealing, solvent vapor annealing, or other annealing methods. Thermal annealing, sometimes referred to as "thermal curing" can be a specific baking process for fixing patterns and removing defects in the layer of the block copolymer assembly, and generally involves heating at elevated temperature (e.g., about 200° C. to about 250° C.), for a prolonged period of time (e.g., several minutes to several days) at or near the end of the film-forming process. Annealing, where performed, typically is used to reduce or remove defects in the layer of lateral microphase-separated domains.

The crosslinkable orientation control layer comprising the crosslinkable orientation control material is compatible with a wide variety of surfaces and methods for controlling the orientation of microphase-separated domains of the block copolymer. The composition of epoxy-containing cycloaliphatic acrylic polymers used as the orientation control material can be tuned to provide a neutral surface for useful microdomain-forming block copolymers such as, for example, poly(styrene-b-methyl methacrylate). These epoxy-containing cycloaliphatic acrylic polymers do not require the addition of an external crosslinking agent to afford a crosslinked product. While many epoxy-containing cycloaliphatic acrylate or methacrylate monomers are hydrophilic, the cycloaliphatic epoxide-based methacrylates are relatively hydrophobic. For example, it has been found that relatively hydrophilic random copolymers of styrene and glycidyl methacrylate have proven either too polar to be neutral to PS-b-PMMA, or to possess insufficient glycidyl groups to afford robust crosslinked films. In another example, the surface neutralization layers disclosed by Gopalan et al. based on terpolymers of styrene, methyl methacrylate, and glycidyl methacrylate require relatively high molecular weights to offset the very low glycidyl methacrylate content. Further, the resulting low crosslink density requires a rinse step to remove unreacted material. Therefore, the material of Gopalan exhibits behavior more consistent with a graft copolymer layer than with a crosslinked film.

In contrast, the hydrophobicity of the cycloaliphatic epoxide-based acrylic monomers disclosed herein allows for the incorporation of sufficient quantities of epoxy groups into the polymer to afford good crosslinking without making the material too polar to be neutral, even when the polymer molecular weight is low (i.e., Mw<10,000 g/mol). Highly crosslinked films are advantageous in that they do not require an extra rinsing step to remove uncrosslinked material, saving process time and cost. In addition the high crosslink density limits swelling or interdiffusion of solvent or other components during subsequent processes, particularly during spin casting of the block copolymer layer. After crosslinking, films of the cycloaliphatic epoxide-based acrylic polymer compositions described herein for the orientation control layer can be washed with highly solvating solvents such as toluene or propylene glycol monomethyl ether acetate ((PGMEA) but exhibit virtually no swelling or thickness loss. Because of these properties, this material can serve as an orientation control material despite the fact that it does not contain both of the repeating structures/monomers in the block copolymer of interest (such as for example, both styrene and methyl methacrylate as found in PS-b-PMMA). The crosslinkable orientation materials are readily preparable at scale using conventional free radical polymerization methods, so that it is unnecessary to employ controlled free radical methods, "living" polymerization methods, or specialty initiators. Molecular weights and compositions are readily tailored by controlling the polymerization conditions (e.g., temperature, time, etc.) and feed ratios, respectively.

In an embodiment, a method of controlling the orientation of microphase-separated domains in a film comprising a block copolymer, comprises (a) forming an orientation control layer comprising an epoxy-containing cycloaliphatic acrylic polymer as an orientation control material, on a surface of a substrate. Forming the orientation control layer comprises applying an orientation control composition comprising the epoxy-containing cycloaliphatic acrylic polymer and a casting solvent on a surface of the substrate. The method of application is not particularly limited, and can be accomplished by a process comprising, for example, spin-casting, dip-coating, doctor blading, spray dispense, or other suitable coating method, which is compatible with the processes and equipment used in microelectronics fabrication assembly lines.

Solvents that can be used vary with the solubility requirements of the orientation control materials. Exemplary casting solvents include propylene glycol monomethyl ether acetate (PGMEA), ethoxyethyl propionate, anisole, ethyl lactate, 2-heptanone, cyclohexanone, amyl acetate, γ-butyrolactone (GBL) and the like. In an embodiment, specifically useful casting solvents include propylene glycol monomethyl ether acetate (PGMEA), γ-butyrolactone (GBL), or a combination of these solvents.

After application, the orientation control layer can be further initially processed to remove the solvent. Spin casting (including spin drying) can in some embodiments suffice to form the layer and remove the solvent. In other embodiments, the orientation control layer is baked at elevated temperature to remove solvent and condense the film. In an embodiment, baking the substrate having the orientation control layer can be done at a temperature of 70 to 150° C. for at least 20 seconds, specifically for 20 to 180 seconds.

In an embodiment, the orientation control composition, from which the orientation control layer is formed, comprises a polymer comprising Formula (1), Formula (2), or a combination comprising at least one of these polymers, as the orientation control material:

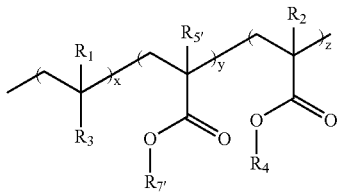

Formula (1)

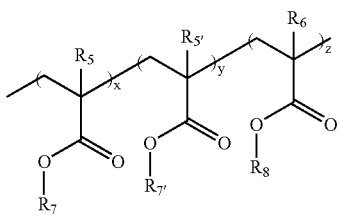

Formula (2)

wherein, in Formulas (1) and (2), $R_1$, $R_2$, $R_{5'}$, and $R_6$ are independently H, F, $CF_3$, or $CH_3$; $R_3$ is a substituted or unsubstituted phenyl, naphthyl, or anthracyl group; $R_4$ and $R_8$ are independently monocyclic or polycyclic $C_{3-30}$ epoxy-containing groups, specifically $C_{6-12}$ epoxy-containing groups; $R_7$ and $R_{7'}$, are each independently a $C_{1-20}$ aromatic group or $C_{1-20}$ aliphatic group, and at least one of $R_5$ and $R_5'$, or $R_7$ and $R_{7'}$ are not identical; and in Formulas (1) and (2), where x and y are independently 0 to 98, z is 2 to 100, the sum of monomer mole percentages x+y+z is at least 85, specifically 85 to 100, and the ratio of mole percentages x+y to z is 0:100 to 98:2.

Useful monomers which provide the epoxy-containing cycloaliphatic functional group of $R_4$ and $R_8$ in Formulas 1 and 2 include monomers selected from the group consisting of 2,3-epoxycyclohexyl (meth)acrylate, (2,3-epoxycyclohexyl)methyl (meth)acrylate, 5,6-epoxynorbornene (meth)acrylate, epoxydicyclopentadienyl (meth)acrylate, and combinations comprising at least one of the foregoing. A preferred monomer is epoxydicyclopentadienyl (meth)acrylate. Herein, where "(meth)acrylate" is used, either an acrylate or methacrylate is contemplated unless otherwise specified.

In an embodiment, the epoxy-containing cycloaliphatic acrylic base polymer is a copolymer or terpolymer further comprising at least one additional monomer having a group $R_3$, $R_5$, $R_{5'}$, $R_7$, $R_{7'}$ in addition to the epoxy-containing monomer. Exemplary additional monomers include methyl (meth)acrylate, ethyl (meth)acrylate, butyl (meth)acrylate, hexyl (meth)acrylate, cyclohexyl (meth)acrylate, benzyl (meth)acrylate, ethylcyclopentyl (meth)acrylate, methylcyclopentyl (meth)acrylate, dicyclopentyl (meth)acrylate, 2-hydroxy ethyl (meth)acrylate, 2-hydroxy propyl (meth)acrylate, hydroxy adamantyl (meth)acrylate, adamantyl (meth)acrylate, methyladamantyl (meth)acrylate, ethyladamantyl (meth)acrylate, phenyladamantyl (meth)acrylate, hydroxyadamantyl (meth)acrylate, isobornyl (meth)acrylate, benzyl (meth)acrylate, gamma-butyrolactone (meth)acrylate, 5-methacryloxy-2,6-norbornane carbolactone, 5-acryloxy-2,6-norbornane carbolactone, 2,2,2-trifluoroethyl (meth)acrylate, 1,1,1,3,3,3-hexafluoroisopropyl (meth)acrylate, styrene, 4-methyl styrene, α-methyl styrene, 4-hydroxy styrene, 4-acetoxy styrene, ethylene, propylene, 1-butene, 1,3-butadiene, vinyl acetate, dihydropyran, norbornene, maleic anhydride, or a combination comprising at least one of the foregoing additional monomers.

In an exemplary embodiment, an epoxy containing base polymer useful herein is poly(styrene-ran-epoxydicyclopentadienyl methacrylate), a random copolymer of styrene and expoxydicyclopentadienyl methacrylate.

The epoxy-containing cycloaliphatic acrylic base polymer desirably has a molecular weight and polydispersity amenable to processing as disclosed herein, including casting. In an embodiment, the epoxy containing polymer has a weight averaged molecular weight (Mw) of 1,500 to 1,000,000 g/mol, specifically 3,000 to 250,000 g/mol, and more specifically 5,000 to 80,000 g/mol. Similarly, the epoxy-containing cycloaliphatic acrylic polymer has a number averaged molecular weight (Mn) of 1,000 to 1,000,000, more specifically 2,000 to 250,000 g/mol, and still more specifically 3,000 to 70,000 g/mol. The epoxy-containing cycloaliphatic acrylic polymer can have a polydispersity (Mw/Mn) of 1.01 to 6, and is not particularly limited. Molecular weight, both Mw and Mn, can be determined by any method used in the art, and is generally determined by gel permeation chromatography using a universal calibration method, calibrated to polystyrene standards.

Figure 4:
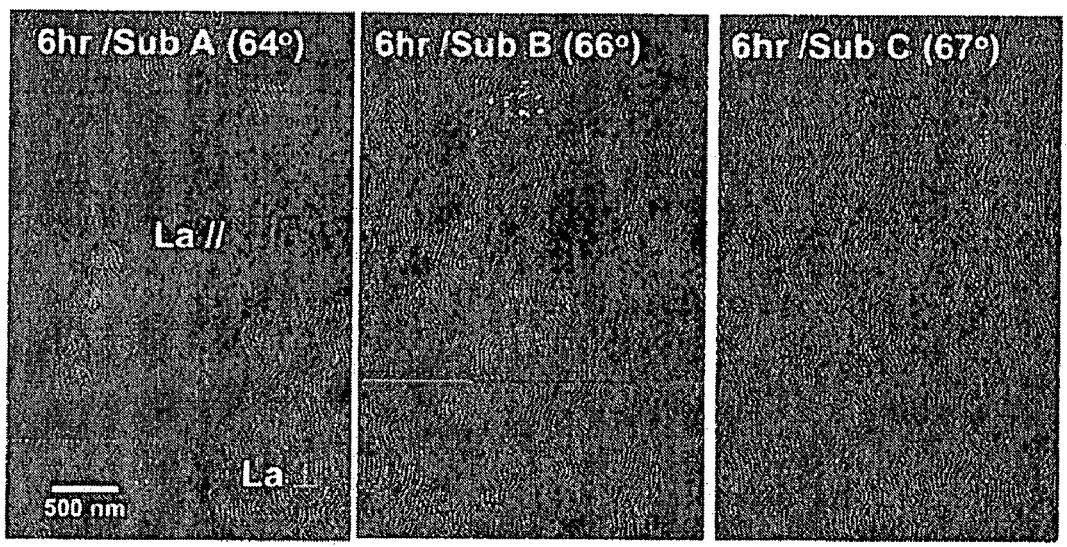
FIG. 4 illustrates the results of casting and annealing thin films of PS-b-PMMA on a surface of different exemplary crosslinked orientation control layer films, Substrate A (Sub. A), Substrate B (Sub. B), and Substrate C (Sub. C), with different compositions, annealed at temperatures of 200° C. for 6 hours.

The composition of the orientation control layer can be adjusted by varying the ratios and identities of the comonomers and by selecting the structure of the cycloaliphatic group. In an exemplary embodiment, where the orientation control layer comprises a copolymer of styrene and epoxydicyclopentadienyl methacrylate, the composition is tunable by varying the ratio of styrene to epoxydicyclopentadienyl methacrylate. For a range of exemplary epoxydicyclopentadienyl methacrylate-containing polymer compositions, the surface will be neutral for lamellae-forming or cylinder-forming PS-B-PMMA diblock copolymers of as illustrated in FIG. 4. In FIG. 4, substrate A has an orientation control layer comprising poly(epoxydicyclopentadienyl methacrylate); substrate B has an orientation control layer comprising poly(epoxydicyclopentadienyl methacrylate-ran-styrene) (90:10 mol/mol monomer ratio, respectively); and substrate C has an orientation control layer comprising poly(epoxydicyclopentadienyl methacrylate-ran-styrene) (80:20 mol/mol monomer ratio) respectively. In this case of substrates A-C, substrate C offers a sufficiently neutral surface that the perpendicular orientation of the phase separated domains is stable even after 6 hours of annealing at 200° C.

Formulations may also contain basic additives as stabilizers, surfactants, and other additives known in the art to improve formulation stability and coating performance. Films may be formed by spin casting, dip-coating, doctor blading, or other film forming methods known in the art, although spin-casting is preferred due to its ready availability as a method in semiconductor fabs. Film thicknesses can be varied from less than 10 nanometers to several micrometers by controlling spin speed and the solids content in the formulation.

In an embodiment, the orientation control composition also comprises an acid or acid generator comprising a thermal acid generator, photoacid generator, or a combination of thermal acid generator and photoacid generator. The epoxide groups crosslink the polymers when heated in the presence of a strong acid catalyst (e.g. triflic acid). The acid can be generated from blocked acid catalysts either via heat (thermal acid generators) or radiation (photoacid generator). Many such suitable acid-generating catalysts are known in the art. Exemplary acid generators include N-hydroxyphthalimide triflate, bis(4-1-butyl phenyl)iodonium triflate, bis(4-t-butyl phenyl)iodonium perfluoro-1-butanesulfonate, bis(4-t-butyl phenyl)iodonium perfluoro-1-octanesulfonate, bis(phenyl)iodonium hexafluoroantimonate, N-hydroxy-5-norbornene-2, 3-dicarboximide perfluoro-1-butanesulfonate, or a combination comprising at least one of the foregoing acid generators.

In an embodiment, the thermal and/or photoacid generator is present in an amount of 0.01 to 40 wt % based on the total weight of the orientation control composition, the additive is present in an amount of 0.01 to 40 wt % of the total weight of the orientation control composition, and the total solids of the orientation control composition comprising base polymer, thermal acid generator and/or photo-acid generator, and additive is 0.5 to 30 wt % based on the total weight of the orientation control composition including casting solvent.

The orientation control layer, after spin casting, is further processed by (b) heating the substrate to crosslink the orientation control layer. In (b), heating comprises baking the substrate having the orientation control layer at a temperature of 100 to 250° C. for at least 30 seconds, specifically 30 to 300 seconds. Treatment of the orientation control layer at these temperatures can effectively crosslink the components of the orientation control layer.

Solvent rinse of the orientation control layer can additionally be performed to ensure no low molecular weight monomeric or oligomeric species are present, prior to application of the block copolymer assembly composition. In an embodiment, the method further comprises (c) rinsing the orientation control layer with a solvent. Any solvent used to rinse an organic layer can be removed to a low residual level (i.e., less than 1 wt % of the film) prior to subsequent application. Accordingly, in another embodiment, the method can further comprise (d) heating the substrate to remove the residual solvent.

Next, in a further film forming operation, (e) a block copolymer assembly layer comprising block copolymers that form microphase-separated domains, is formed on a surface of the orientation control layer opposite the substrate.

The block copolymer of the block copolymer assembly comprises blocks comprising one or more monomers, and at least two blocks in the block copolymer are compositionally, structurally, or both compositionally and structurally non-identical. The block copolymer can be a diblock copolymer, triblock copolymer, or multiblock copolymer. The blocks themselves can be homopolymers or copolymers. Different kinds of block copolymers can be used in the block copolymer assembly, including an amphiphilic organic block copolymer, amphiphilic inorganic block copolymer, organic di-block copolymer, organic multi-block copolymer, inorganic-containing di-block copolymer, inorganic-containing multi-block copolymer, linear block copolymer, star block copolymer, dendritic block copolymer, hyperbranched block copolymer, graft block copolymer, or a combination comprising at least one of the foregoing block copolymers. Suitable inorganic constituents of the inorganic-containing polymers, monomers, molecules, and additives include, for example, those based on silicon, germanium, iron, titanium, aluminum, or the like. Exemplary silicon- and germanium-containing monomers and polymers can include those disclosed by H. Ito in "Chemical Amplification Resists for Microlithography" *Adv. Polym. Sci.*, vol. 172, pp. 37-245 (2005); exemplary metal containing monomers and polymers include those disclosed by Ian Manners in "Synthetic Metal-containing Polymers", Wiley-VCH, 2004; exemplary silicon-containing molecules and additives such as organosilicates include those disclosed by E. M. Freer, L. E. Krupp, W. D. Hinsberg, P. M.

Rice, J. L. Hedrick, J. N. Cha, R. D. Miller, and H. C. Kim in "Oriented mesoporous organosilicate thin films", *Nano Letters*, vol. 5, 2014 (2005); and exemplary metal-containing molecules and additives include those disclosed by Jinan Chai, Dong Wang, Xiangning Fan, and Jillian M. Buriak, "Assembly of aligned linear metallic patterns on silicon", *Nature Nanotechnology*, vol. 2, p. 500, (2007).

The blocks can be any appropriate microdomain-forming block that can be copolymerized with another, dissimilar block. Blocks can be derived from different polymerizable monomers, where the blocks can include but are not limited to: polyolefins including polydienes, polyethers including poly(alkylene oxides) such as poly(ethylene oxide), poly(propylene oxide), poly(butylene oxide), or random or block copolymers of these; poly((meth)acrylates), polystyrenes, polyesters, polyorganosiloxanes, polyorganogermanes, and the like.

In an embodiment, the blocks of the block copolymer comprise as monomers $C_{2-30}$ olefinic monomers, (meth)acrylate monomers derived from $C_{1-30}$ alcohols, inorganic-containing monomers including those based on Fe, Si, Ge, Sn, Al, Ti, or a combination comprising at least one of the foregoing monomers. In a specific embodiment, exemplary monomers for use in the blocks can include, as the $C_{2-30}$ olefinic monomers, ethylene, propylene, 1-butene, 1,3-butadiene, isoprene, vinyl acetate, dihydropyran, norbornene, maleic anhydride, styrene, 4-hydroxy styrene, 4-acetoxy styrene, 4-methylstyrene, or α-methylstyrene; and can include as (meth)acrylate monomers derived from $C_{1-30}$ alcohols, methyl (meth)acrylate, ethyl (meth)acrylate, n-propyl (meth)acrylate, isopropyl (meth)acrylate, n-butyl (meth)acrylate, isobutyl (meth) acrylate, n-pentyl (meth)acrylate, isopentyl (meth)acrylate, neopentyl (meth)acrylate, n-hexyl (meth)acrylate, cyclohexyl (meth)acrylate, isobornyl (meth)acrylate, or hydroxyethyl (meth)acrylate. Combinations of two or more of these monomers can be used. Exemplary blocks which are homopolymers can include blocks prepared using styrene (i.e., polystyrene blocks), or (meth)acrylate homopolymeric blocks such as poly(methylmethacrylate); exemplary random blocks include, for example, blocks of styrene and methyl methacrylate (e.g., poly(styrene-co-methyl methacrylate)), randomly copolymerized; and an exemplary alternating copolymer block can include blocks of styrene and maleic anhydride which is known to form a styrene-maleic anhydride diad repeating structure due to the inability of maleic anhydride to homopolymerize under most conditions (e.g., poly(styrene-alt-maleic anhydride)). It will be understood that such blocks are exemplary and should not be considered to be limiting.

Exemplary block copolymers that are contemplated for use in the present method also include diblock copolymers such as poly(styrene-b-vinyl pyridine), poly(styrene-b-butadiene), poly(styrene-b-isoprene), poly(styrene-b-methyl methacrylate), poly(styrene-b-alkenyl aromatics), poly(isoprene-b-ethylene oxide), poly(styrene-b-(ethylene-propylene)), poly(ethylene oxide-b-caprolactone), poly(butadiene-b-ethylene oxide), poly(styrene-b-t-butyl (meth)acrylate), poly(methyl methacrylate-b-t-butyl methacrylate), poly(ethylene oxide-b-propylene oxide), poly(styrene-b-tetrahydrofuran), poly(styrene-b-isoprene-b-ethylene oxide), or a combination comprising at least one of the foregoing block copolymers.

The block copolymer desirably has an overall molecular weight and polydispersity amenable to further processing. In an embodiment, the block copolymer has a weight-averaged molecular weight (Mw) of 3,000 to 100,000 g/mol. Similarly, the block copolymer has a number averaged molecular weight (Mn) of 1,000 to 60,000. The block copolymer can also have a polydispersity (Mw/Mn) of 1.01 to 6, and is not particularly limited thereto. Molecular weight, both Mw and Mn, can be determined by, for example, gel permeation chromatography using a universal calibration method, calibrated to polystyrene standards.

In an embodiment, forming the block copolymer assembly layer comprises applying a block copolymer composition comprising the block copolymer and a casting solvent, to a surface of the orientation control layer opposite the substrate. Applying can be accomplished by a process comprising spin casting, dip coating, doctor blading, or spray dispense.

After applying, the substrate having the block copolymer and orientation control layers can be baked at a temperature of 70 to 150° C. for at least 20 seconds, specifically 20 to 180 seconds.

In addition, the block copolymer composition can comprise additional components selected from the group consisting of: additional polymers, including homopolymers, random copolymers, crosslinkable polymers, or inorganic-containing polymers; additives including small molecules, inorganic-containing molecules, surfactants, photoacid generators, thermal acid generators, quenchers, hardeners, crosslinkers, chain extenders, or a combination comprising at least one of the foregoing; and combinations comprising at least one of the foregoing, wherein one or more of the additional components co-assemble with the block copolymer to form the block copolymer assembly layer.

In this way, an oriented block copolymer film is prepared by the above method, wherein the microphase-separated domains comprise cylindrical microdomains oriented perpendicular to the surface of the orientation control layer, or wherein the microphase-separated domains comprise lamellar domains oriented perpendicularly to the surface of the orientation control layer.

Figure 5:
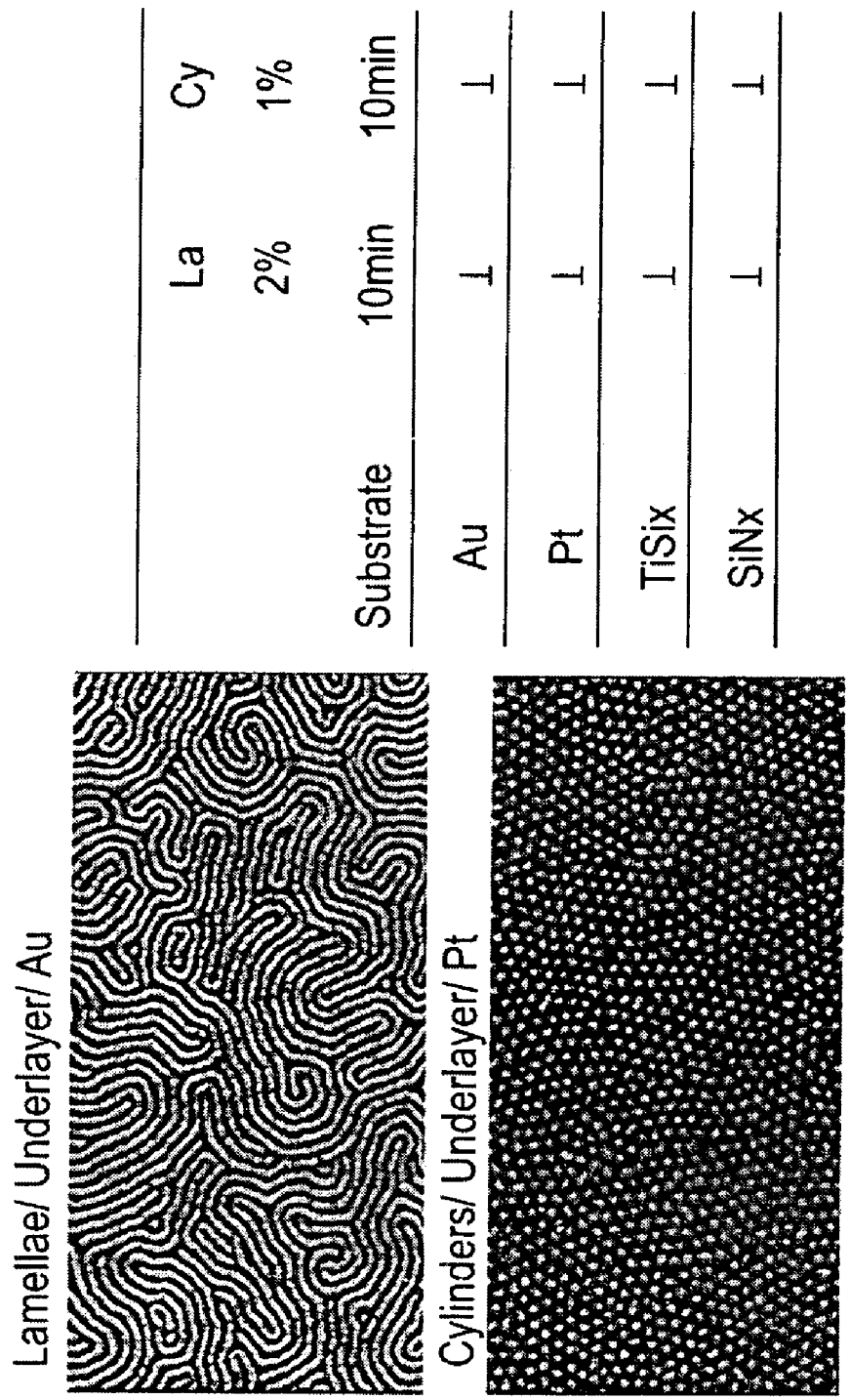
FIG. 5 illustrates the compatibility of crosslinked orientation control layer compositions on different surfaces.

During forming of the block copolymer assembly layer, the domains of the block copolymer align perpendicular to the surface of the orientation control layer. After coating a layer of block copolymers such as poly(styrene-b-methyl methacrylate) and annealing, the domains of the block copolymer will remain perpendicular to the neutral surface. The orientation control layer can itself be formed on top of and crosslinked to a variety of surfaces such as silicon, silicon oxide, silicon nitride, gold, and platinum and many other substrates, when baked in the presence of acid (formed thermally from a thermal acid generator or photochemically from a photoacid generator) as shown in FIG. 5. Hardmask materials disposed on a substrate or substrate stack can be used as the substrate in the case a trilayer-type pattern transfer process. Alternatively, very thick orientation control layers can be formed which can serve as transfer layers if a bilayer-type pattern transfer process is desired, in which one of the blocks of the block copolymer has perpendicular etch selectivity due inorganic-containing units or via a co-assembling additive.

A topographical pattern is then formed in the block copolymer film. In a film comprising the block copolymer assembly comprising microdomains, those microdomains having a common composition can be selectively removed by a suitable process such as wet or dry etch, development, or solvent solubility, so that one microdomain comprising one kind of block is selectively removed over another microdomain comprising another kind of block. Thus, in an embodiment, a microdomain of the block copolymer film is selectively removed to provide a topographical pattern. The topographical pattern can then be transferred to the substrate by a suitable subsequent etch process. In an embodiment, the topographical pattern is generated by selectively etching a microdomain having a higher Ohnishi number than the other microphase-separated domain(s) by an oxygen plasma etch.

The pattern forming method disclosed herein maybe used in an imaging scheme such as a bilayer or trilayer scheme, for high-resolution patterning of a substrate. In a bilayer scheme, the block copolymer of the block copolymer assembly layer has a block comprising inorganic-containing monomers (such as silicon or germanium containing monomers); or wherein the block copolymer assembly layer comprises, in addition to the block copolymer, inorganic-containing polymers (such as germanium-containing polymers or silicon-containing polymers), inorganic-containing molecules (such as silicon-containing or germanium-containing molecules), which co-assemble with the microphase-separated domains of the block copolymer to form the block copolymer assembly layer. The orientation control layer has, in an embodiment, a thickness of less than or equal to 100 nm.

Figure 6:
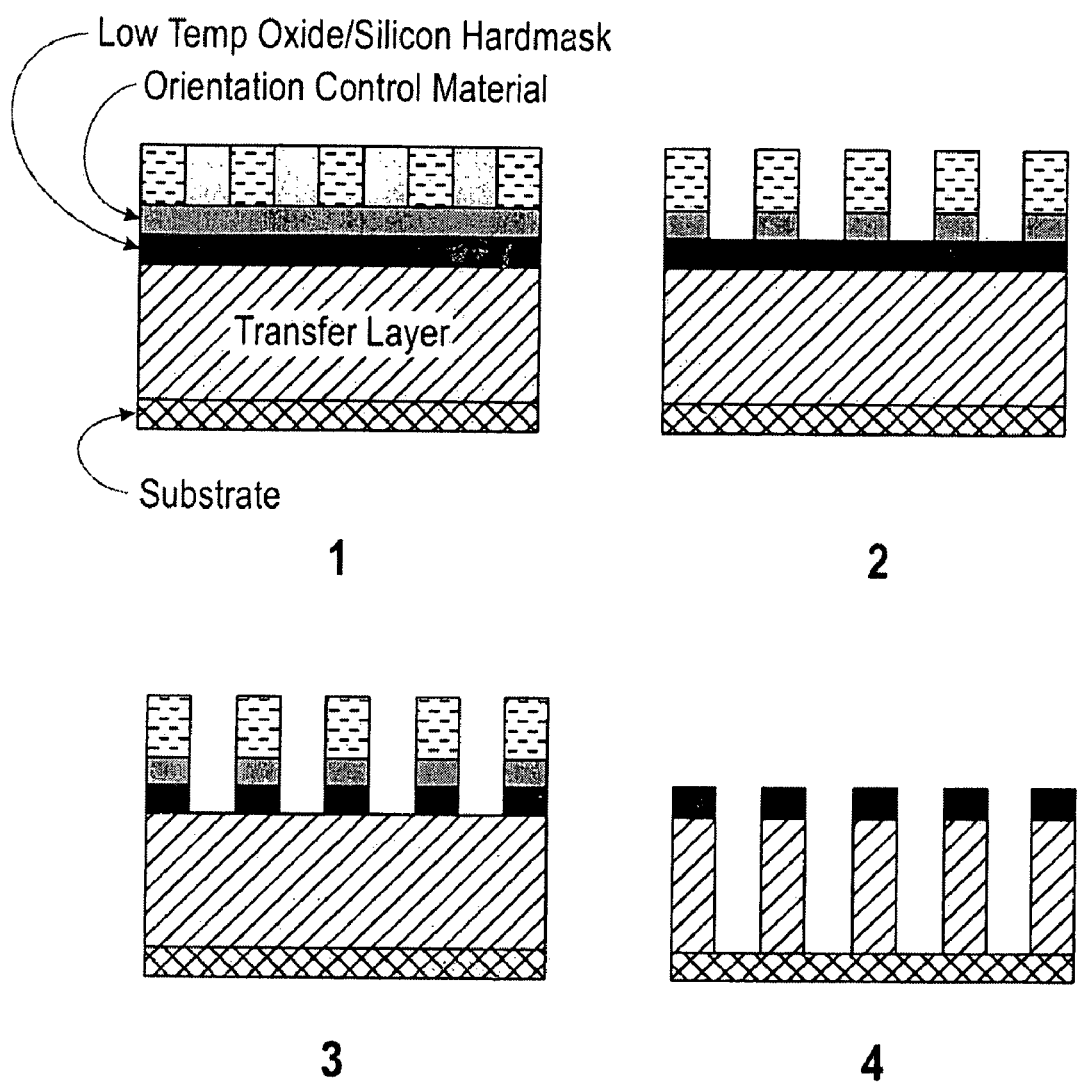
FIG. 6 illustrates an embodiment of a trilayer-type patterning process using a thin layer of the orientation control material on top of a hardmask and a transfer layer disposed between surfaces of the substrate and the hardmask.

The perpendicular orientation of the block copolymer domains is desirable so the pattern can be readily transferred to the underlying substrate by processes such as dry or wet chemical etching. The perpendicular orientation of block copolymer domains can also generate lamellar and cylindrical morphologies with high-vertical aspect ratio. In some cases, the orientation control layer and block copolymers can be coated directly on the substrate of interest and the pattern transferred directly into the underlying substrate. However, in a specific embodiment, a trilayer pattern transfer scheme shown in FIG. 6 can be used. FIG. 6 shows (1) a block copolymer layer, disposed on the orientation control layer, in turn disposed on a surface of a hardmask, all of which are disposed in this order on a surface of an organic pattern transfer layer that is in contact with the substrate surface. The pattern is transferred (2) to the orientation control layer from the microdomain-patterned block copolymer layer, then to the hardmask layer (3) by appropriate etch processes. Finally, the organic layers on the hardmask are removed, and the pattern transferred (4) to the relatively thick transfer layer from the patterned hardmask. The thin block copolymer pattern can be transferred first to the orientation control layer, then into the hardmask layer, relying on differing etch resistance of the various segments of the block copolymer. In the case of, for example, PS-b-PMMA, the relative etch rate selectivity in oxygen reaction ion etching is relatively small and the film is thin. Therefore, it is beneficial to have a thin orientation control layer (less than or equal to 20 nm) such that pattern fidelity is not lost while etching through the orientation control layer. The pattern can be directly transferred through the underlayer into the hardmask, or optionally, one of the domains of the block copolymer can be removed before pattern transfer. Once the pattern is successfully transferred into the hardmask, it can be transferred easily through the underlying transfer layer and then on into the substrate without difficulty.

Thus, in an embodiment, the substrate further comprises an underlayer disposed on a surface of the substrate, and a hardmask disposed on a surface of the underlayer opposite the substrate, and wherein the orientation control layer is disposed on a surface of the hardmask opposite the underlayer. In a further embodiment, the orientation control layer has a thickness of less than or equal to 20 nm.

Figure 7:
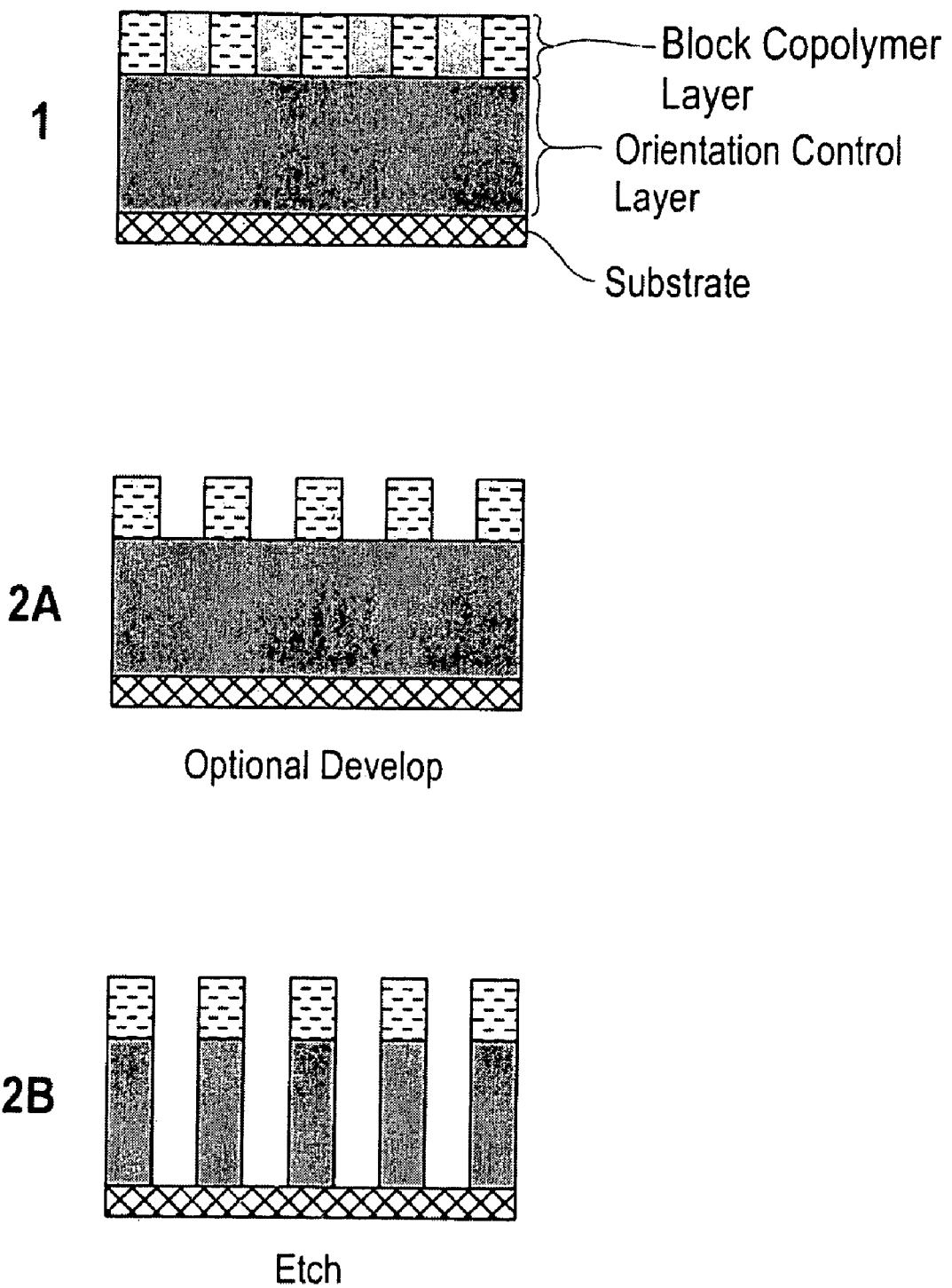
FIG. 7 illustrates an embodiment of a bilayer-type patterning process using a patterned layer of block copolymer containing a highly etch-resistant block, and a relatively thick (greater than 100 nm) layer of the orientation control material as a transfer layer.

Block copolymers containing an inorganic group such as silicon or germanium can be integrated into a bilayer-type patterning scheme (see FIG. 7). FIG. 7 shows (1) a block copolymer layer with highly etch-resistant microdomains, disposed on a relatively thick orientation control layer acting as the organic pattern transfer layer, both of which are disposed in this order on a surface of the substrate surface. The pattern is generated (2*a*) in the block copolymer layer, and transferred to the orientation control layer (2*b*) by an appropriate etch process. The pattern in (2*a*) can be established either by an etch or developing process, or optionally, the nascent pattern on the unetched or undeveloped block copolymer layer (1) can be etched through both the block copolymer layer and the orientation control layer to the substrate in a single etch process.

In this case, sufficient (or perpendicular) relative etch resistance exists between the block copolymer segments such that etching through a thick transfer layer can be achieved without loss of pattern fidelity. In this case, a thick coating (>100 nm) of crosslinked orientation control underlayer can serve both as an orientation control layer and as an etchable pattern transfer layer during the subsequent pattern transfer process. The pattern can be directly transferred through the thick underlayer or, like in the trilayer scheme, one of the block copolymer domains may be removed beforehand. After pattern formation in the block copolymer layer, pattern transfer to the orientation control layer is effected by a reactive-ion plasma etch process.

The film forming method can further comprise annealing the substrate to induce pattern formation in the block copolymer-layer. In an embodiment, annealing is by thermal annealing, and can be carried out at 80 to 300° C. for a time of 30 seconds to 20 hours. In a further embodiment, the pattern can be established by removing at least one domain to generate a topographical pattern or to transfer the pattern in the block copolymer to the subsequent layers.

Figure 8A:
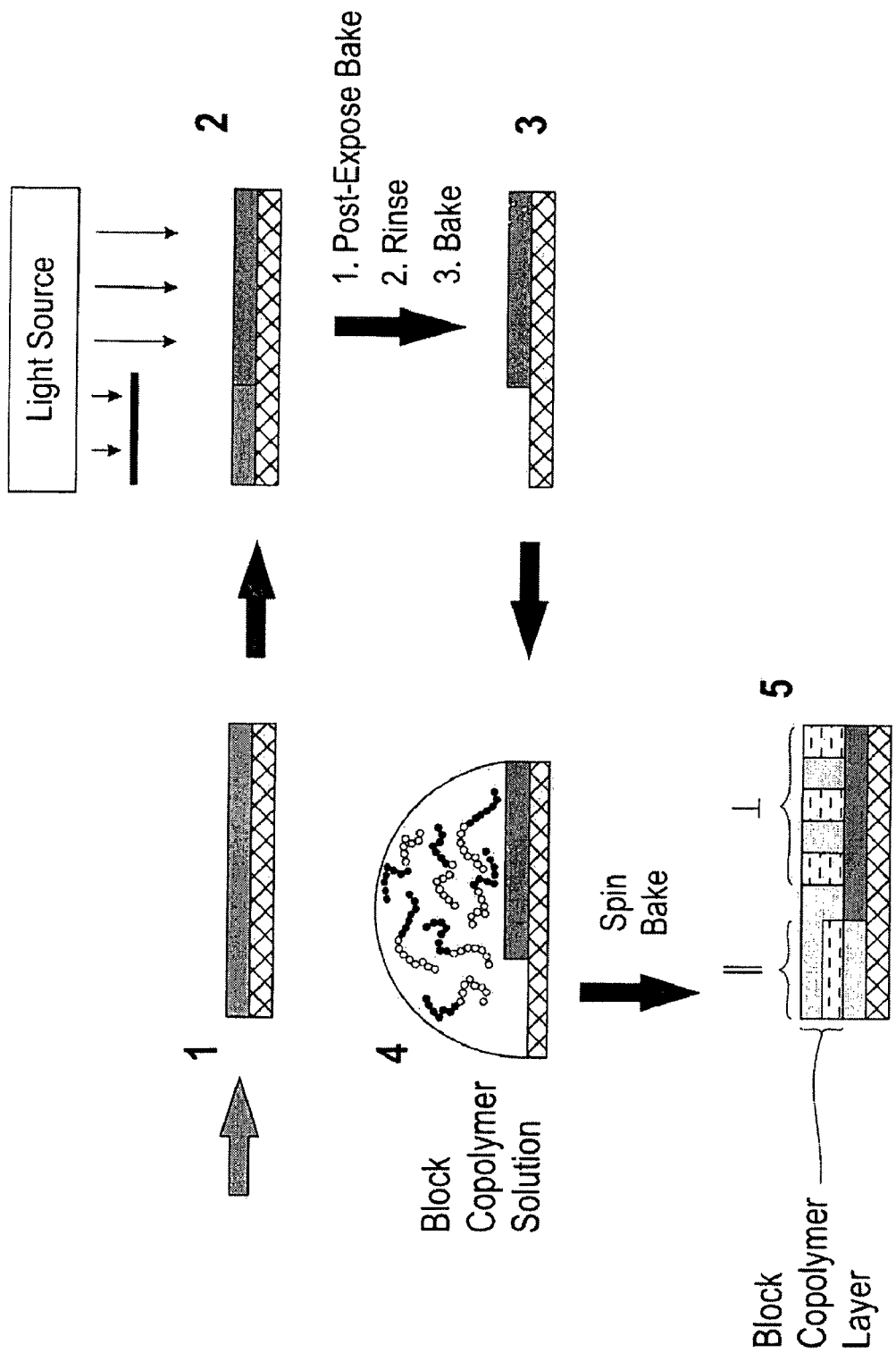
FIG. 8 illustrates (A) a method of photopatterning the deposited crosslinked orientation control layer on a substrate to achieve perpendicular orientation of the self-assembled domains only in specified regions, and (B) atomic force microscope (AFM) images of parallel-oriented PS-b-PMMA lamellae in an unexposed region, and (C) perpendicularly-oriented PS-b-PMMA lamellae on a deep UV exposed region.

In an embodiment, the ability to photochemically generate the acid required for crosslinking enables the patterning of the neutral surface on a substrate in an initial lithography step. In one example, a crosslinked film of the neutral underlayer would only be formed in the exposed regions. Subsequent casting and annealing of a block copolymer on the patterned surface would result in perpendicular orientation of the block copolymer domains only on the patterned neutral areas with parallel orientation in the non-neutral areas. This scheme is outlined in FIG. 8. FIG. 8A shows photopatterning of an orientation control underlayer. A substrate is coated (1), then exposed (2) with a light source (flood exposure or stepper, using UV light) and photomask. Then, after post exposure processing including a post-exposure bake, rinse, and optionally a final bake, and development of the features, the patterned orientation control layer (3) is then coated with a solution of block copolymer (4), followed by spinning and baking to remove solvent and orient the microdomains to form a pattern (5) in which the microdomains form perpendicularly (⊥) over the remaining orientation control layer, and form parallel microdomains (∥) over the exposed regions of the substrate.

Thus, in an embodiment, a method of controlling the orientation of microphase-separated domains in specific areas of a substrate coated with a block copolymer film, comprises (a) forming an orientation control layer comprising an epoxy-containing cycloaliphatic acrylic polymer over a surface of a substrate, (b) exposing the orientation control layer patternwise with actinic radiation, EUV, or electron beam, to form a pattern of exposed and unexposed regions of the orientation control layer, (c) heating the substrate to crosslink the orientation control layer in the exposed regions, (d) removing uncrosslinked orientation control layer material in the unexposed regions with a solvent to uncover the surface of the substrate in the unexposed regions, (e) optionally, heating the substrate having the patterned crosslinked orientation control layer to remove residual solvent, (f) forming a block copolymer assembly layer comprising block copolymers having at least two microphase-separated domains, on a surface of the patterned crosslinked orientation control layer opposite the substrate, and (g) annealing the substrate to induce pattern formation in the block copolymer layer, wherein the lamellae form perpendicular to the plane of the substrate over the crosslinked orientation control layer, and wherein the lamellae form parallel to the plane of the substrate over the uncovered surface of the substrate.

Figure 9A:
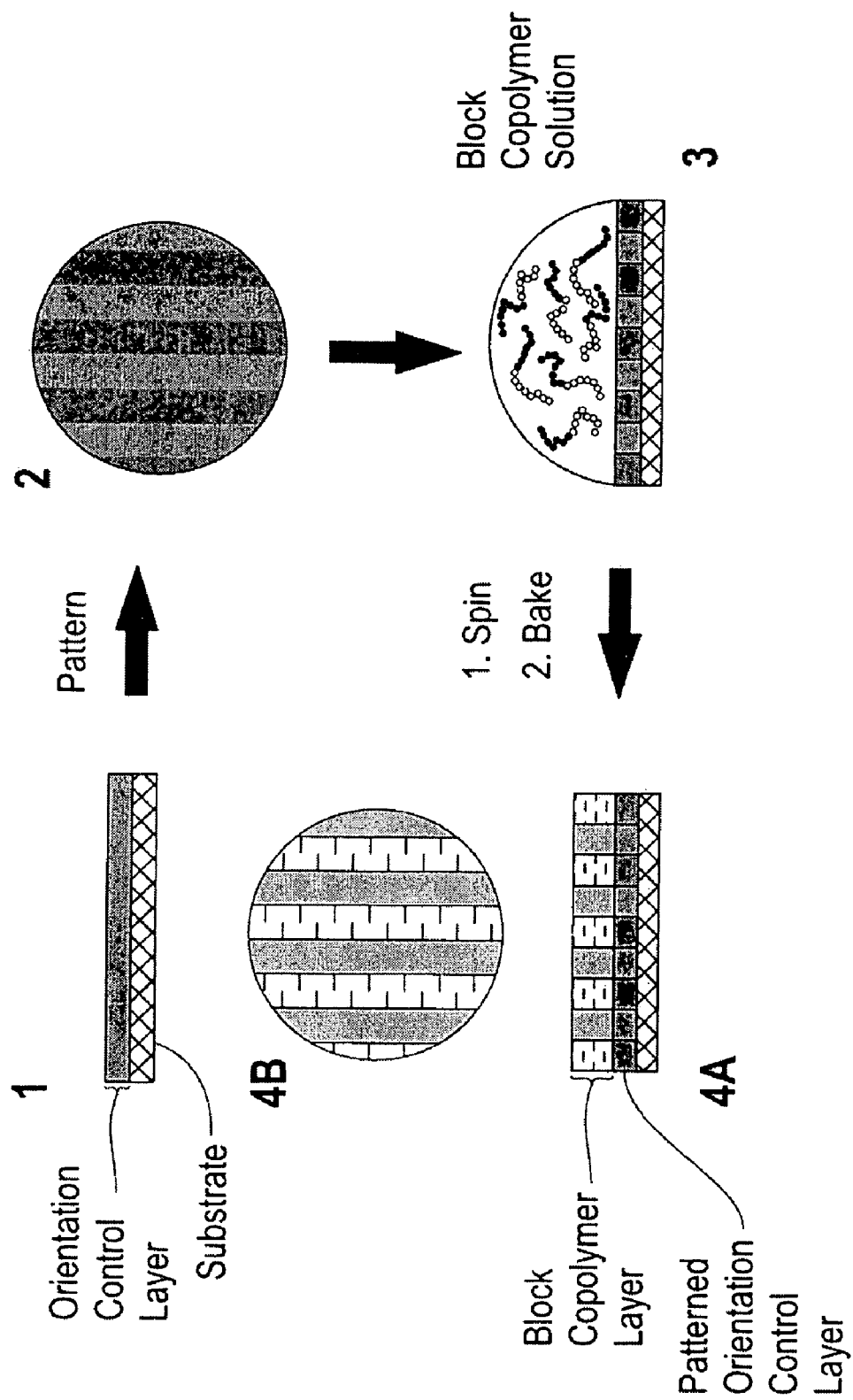
FIG. 9 illustrates (A) a method of patterning a crosslinked orientation control layer to achieve patterned regions of neutrality to direct the x-y placement of self-assembled domains, and (B) an AFM image of PS-b-PMMA lamellae with perpendicular orientation on electron-beam patterned poly(epoxydicyclopentadienyl methacrylate-ran-styrene) (30:70 ratio of mole percentages of epoxydicyclopentadienyl methacrylate to styrene) showing well-aligned PS-b-PMMA lamellae.

In a further technique shown in FIG. 9, a blanket film of the crosslinked orientation control layer can be patterned by subjecting it to various radiation (from deep ultraviolet, extreme ultraviolet, x-ray, ion, or electron beam sources). The patterned areas will become non-neutral and, in the best cases, develop an affinity for one of the segments of the block copolymer. This patterning of selective and neutral surface domains affords the ability to not only control perpendicular vs. parallel orientation but also x-y placement of the block copolymer domains. Using the inventive compositions described herein, well-aligned block copolymers such as, for example, PS-b-PMMA can be achieved with, in an exemplary embodiment, an electron-beam patterned neutral underlayer. The method is shown in FIG. 9A.

FIG. 9A shows patterning on an orientation control layer. A substrate is coated with the orientation control layer (1), then a nascent pattern formed by selective exposure (2, top view) by DUV lithography or laser interferometry, or by using radiation or other energetic patterning source such as EUV, x-ray, e-beam, or ion beam, with a pattern mask where appropriate. The pitch of the patterned orientation control layer is about the same as the pitch of the block copolymer. The patterned orientation control layer (3) is then coated with a solution of block copolymer (3), followed by spinning and baking to remove solvent and orient the microdomains to form a pattern (4a) in which the microdomains form perpendicularly over the exposed regions of the substrate to provide a pattern (4b, top view). Blocks with an affinity for the exposed regions of the orientation control layer selectively form microdomains on the exposed regions and the other blocks form domains on the adjacent unexposed regions. Therefore, the block copolymer domains align on the underlying patterns on the orientation control layer and replicate the patterns. In another embodiment, not shown, the pitch of the pattern established in the orientation control layer can be significantly larger than the pitch of the lamellae. In this instance, the lamellae of one block form parallel to the plane of the wafer on the exposed part of the patterned orientation control layer, and the lamellae of the other block form perpendicular to the plane of the wafer on the unexposed portions of the patterned orientation control layer.

Thus, in another embodiment, a method of controlling the orientation of microphase-separated domains and the directional alignment of the microphase-separated domains in a block copolymer film, comprises (a) forming an orientation control layer comprising an epoxy-containing cycloaliphatic acrylic polymer over a surface of a substrate, (b) heating the substrate to crosslink the orientation control layer, (c) optionally, rinsing the orientation control layer with a solvent, (d) optionally, heating the substrate to remove residual solvent, (e) exposing the orientation control layer pattern-wise with actinic radiation, EUV, x-ray, or electron beam, to form a pattern of exposed and unexposed regions of the orientation control layer, (f) optionally, rinsing the patterned orientation control layer with a solvent, (g) optionally, heating the substrate having the patterned orientation control layer to remove residual solvent, (h) forming a block copolymer assembly layer comprising a block copolymer having at least one block that forms microphase-separated domains on a surface of the patterned orientation control layer opposite the substrate, and (i) annealing the substrate to induce microphase-separated domains to form a pattern in the block copolymer layer. In one specific embodiment, wherein the microphase-separated domains are lamellae, and wherein a pitch of the pattern in the patterned orientation control layer is an order of magnitude larger than the pitch of lamellae, the lamellae form parallel to the plane of the substrate over the exposed region of the patterned orientation control layer, and form perpendicular to the plane of the substrate on the unexposed region of patterned orientation control layer. In another specific embodiment, where the microphase-separated domains are lamellae and a pitch of the pattern in the patterned orientation control layer is about the same as a pitch of the pattern in the block copolymer layer, the exposed region is wetted by one domain of the block copolymer and the unexposed region is wetted by the other domain(s) of block copolymer, and the block copolymer forms a spatial replica of the underlying patterned orientation control layer.

Articles can be prepared using the method described hereinabove. As one example, one or more aspects of the present invention can be included in an article of manufacture, e.g., one or more computer hardware products such as permanent or rewriteable data storage media such as hard disks readable by a machine, employing, for instance, computer usable media. The media has embodied therein, for instance, computer readable program code means for providing and facilitating the capabilities of the present invention. The article of manufacture can be included as a part of a computer system or sold separately. Other exemplary applications include fabrication of semiconductors including microprocessors including those with memory caches, ASICs, and/or memory chips including DRAM, SRAM, Flash, and the like.

The flow diagrams of the figures depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The invention is further described with respect to the examples, below.

EXAMPLES

The following examples are intended to provide those of ordinary skill in the art with a complete disclosure and description of how to prepare and use the compositions disclosed and claimed herein. Efforts have been made to ensure accuracy with respect to measured numbers, but allowance should be made for the possibility of errors and deviations. Unless indicated otherwise, parts are parts by weight, temperature is in ° C. and pressure is at or near atmospheric. Epoxydicyclopentadienyl methacrylate was obtained from Elf-Atochem. Lamellae-forming poly(styrene-b-methyl methacrylate) (18,000 g/mol/18,000 g/mol block sizes, respectively) was obtained from Polymer Source. Cylinder-forming poly(styrene-h-methyl methacrylate) (17,000 g/mol/38,000 g/mol block sizes, respectively) was prepared by copolymerizing styrene and methyl methacrylate by a known procedure using the method of reversible addition-fragmentation chain transfer (RAFT) polymerization. PMMA precursors with phenyl dithiobenzoate end groups were used as a macromolecular chain transfer agent for the RAFT polymerization. For a further description of the method used, see Junwon Han, Chang Y. Ryu, Ho-Cheol Kim, Greg Breyta, and Hiroshi Ito, "Adsorption and Fractionation of RAFT-polymerized PS-b-PMMA Block Copolymers for 2D Liquid Chromatography," American Physical Society March Meeting Abstract N17.00003 (2007). Additionally, all the other chemicals and materials were obtained commercially.

The following techniques and equipment were utilized in analysis of the examples: $^1$H and $^{13}$C NMR spectra were obtained at room temperature, and quantitative $^{13}$C NMR was run at room temperature in acetone-$d_6$ in an inverse-gated $^1$H-decoupled mode using Cr(acac)$_3$ as a relaxation agent, on a Bruker AVANCE™ 400 NMR spectrometer. Thermo-gravimetric analysis (TGA) was performed at a heating rate of 5° C./min in N$_2$ on a TA Instrument Hi-Res TGA 2950 Thermogravimetric Analyzer. Differential scanning calorimetry (DSC) was performed at a heating rate of 5° C./min on a TA Instruments DSC 2920 modulated differential scanning calorimeter. Molecular weights were measured in tetrahydrofuran (THF) on a Waters Model 150 chromatograph relative to polystyrene standards. Film thickness was measured on a Tencor ALPHA-STEP® 2000 or Nanometrics NANO-SPEC® film analysis system.

Contact angles were measured on an OCA video based contact angle system from FDS Future Digital Scientific Corporation, using the sessile drop method. The advancing and receding contact angles were measured using a tilting stage. The advancing and receding contact angles were measured using two different setups: tilting stage and/or captive drop. Unless otherwise noted, all contact angles were measured using the tilting stage. Reported static contact angles are calculated averages from 5 to 10 measurements of a 2 µl ionized water drop. For advancing and receding contact angles, a 50 µl drop is placed on the substrate, the substrate is thereafter tilted until the droplet starts moving. The tilt angle ($\theta_{tilt}$), $\theta_{adv}$ and $\theta_{rec}$ are measured just before the drop starts moving. The presented numbers are calculated from and average of 3 to 5 separate measurements.

General Synthesis Method for poly(epoxydicyclopentadienyl methacrylate-ran-styrene) polymers Epoxydicyclopentadienyl methacrylate (EDCPDMA) (1.78 g, 17.1 mmol, 0.5 eq.), styrene (4.0 g, 17.1 mmol, 0.5 eq.), and 2,2'-azobis(2-methylpropionitrile) (AIBN) (0.224 g, 1.37 mmol, 0.04 eq.) were added to 20 ml, tetrahydrofuran in a 100 mL round-bottom flask equipped with a reflux condenser and a nitrogen line. The solution was degassed by 3 pump-backfill cycles using nitrogen. The degassed solution was refluxed overnight (10 to 12 hours) under a nitrogen atmosphere. The polymers were precipitated into 800 mL hexanes, isolated on a glass fritted filter, washed with hexanes and dried overnight in vacuo at 70° C. Yield: 4.74 g (82%).

Polymers were synthesized according to the general procedure, using the appropriate ratios of monomers and initiator. For high styrene content polymers (>70%), methanol was used in place of hexanes as the non-solvent for precipitations. Molecular weight (Mn) and polydispersity data for the resulting polymers are shown in Table 1, below.

TABLE 1

| Polymer | EDCPDMA/styrene | $M_n$ [g/mol] | PDI |
| --- | --- | --- | --- |
| 1 | 100:0 | 14925 | 2.61 |
| 2 | 90:10 | 12212 | 1.93 |
| 3 | 80:20 | 8415 | 1.82 |
| 4 | 70:30 | 8192 | 1.58 |
| 5 | 60:40 | 6860 | 1.66 |
| 6 | 50:50 | 6209 | 1.62 |
| 7 | 40:60 | 6355 | 1.61 |
| 8 | 30:70 | 5819 | 1.51 |
| 9 | 20:80 | 5927 | 1.50 |
| 10 | 10:90 | 6433 | 1.48 |

Formulation of poly(epoxydicyclopentadienyl methacrylate-ran-styrene)

Poly(epoxydicyclopentadienyl methacrylate-ran-styrene) was dissolved in propylene glycol monomethyl ether acetate (PGMEA) and γ-butyrolactone (GBL) (solvent mixture ratios ranging from 100:0 to 70:30, depending on the polymer) with N-hydroxyphthalimide triflate (10 wt % relative to polymer) as a thermal acid generator at a total solids of 1-2% by weight based on the formulation. Other strong thermal and photoacid generators were also found to be sufficient to catalyze crosslinking, including bis(4-t-butyl phenyl)iodonium triflate, bis(4-t-butyl phenyl)iodonium perfluoro-1-butanesulfonate, bis(4-1-butyl phenyl)iodonium perfluoro-1-octanesulfonate, bis(phenyl)iodonium hexafluoroantimonate, and N-hydroxy-5-norbornene-2,3-dicarboximide perfluoro-1-butanesulfonate.

Preparation of Crosslinked Films of poly(epoxydicyclopentadienyl methacrylate-ran-styrene)

Figure 2:
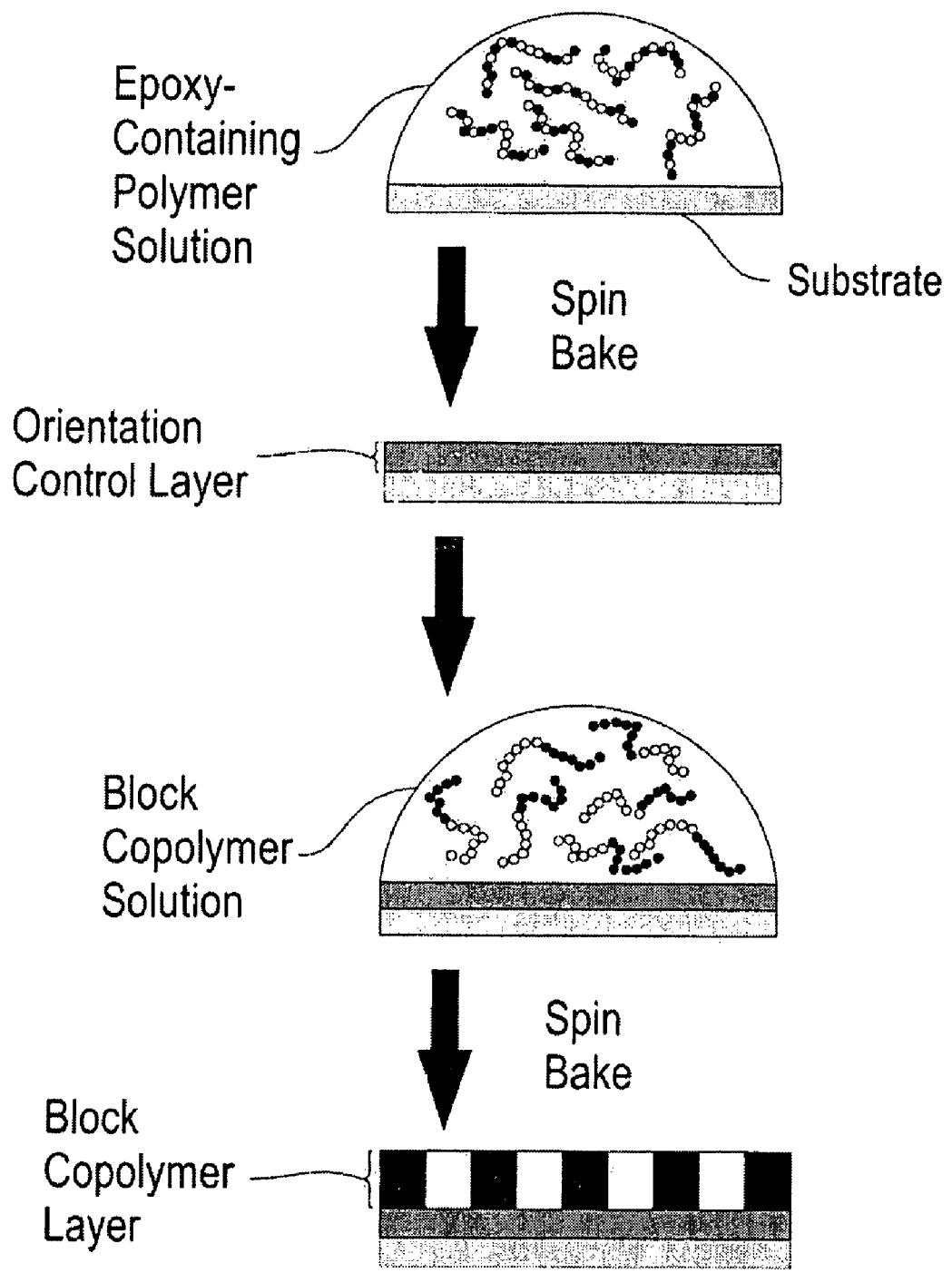
FIG. 2 illustrates a schematic representation of an exemplary orientation control method using an layer of the orientation control material.
Figure 3:
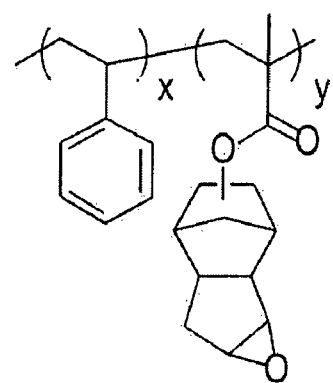
FIG. 3 illustrates the structure of an exemplary poly(epoxydicyclopentadienyl methacrylate-ran-styrene) crosslinkable orientation control material.

Films were prepared by spin casting on silicon wafers at 2,000 to 3,000 rpm as shown in FIG. 2. Film thickness was controlled by varying the solids content of the casting solution and the spin rate during spin-casting. The films were crosslinked in a two-step cure (130° C. for 60 sec, and 200° C. for 120 sec). Crosslinking was verified by exposing the cured films to puddles of organic solvent such as toluene or PGMEA for 60 to 90 seconds and spin-drying. No film thickness loss or swelling was observed. The roughness of the surfaces was characterized by AFM. Contact angle measurements (degrees) were used as a surrogate method for determining relative surface energies, in which a lower contact angle indicates a higher relative surface energy.

Orientation of PS-b-PMMA Domains on Neutral Crosslinked Orientation Control Layers Solutions of PS-b-PMMA were cast onto the crosslinked neutral orientation control layers from PGMEA and annealed at 200° C. for times varying from 1 minute to 18 hours. Orientation of the PS and PMMA domains was observed by atomic force microscopy.

Table 2 shows the orientation of PS-b-PMMA block copolymers that form lamellae (La) and cylinders (Cy) on crosslinked orientation control layers of the composition described in Table 1 compositions as a function of annealing time. The composition of the orientation control layer polymer, contact angle (CA, in degrees), and annealing time are given. Perpendicular lamellae or cylinders are formed as indicated by the symbol "⊥"; where fewer than 100% of such features are formed, the amount is indicated as a percentage. The total solids content of the formulation is 1% or 2% by weight, as indicated.

TABLE 2

| EDCPDMA/Styrene | CA | La 1% 1 min | La 1% 6 hr | La 2% 1 min | La 2% 6 hr | La 2% 18 hr | Cy 1% 1 min | Cy 1% 10 min |
| --- | --- | --- | --- | --- | --- | --- | --- | --- |
| 100:0 | 63.6 | ⊥ | ⊥ | ⊥ | <50%⊥ | ~0%⊥ | ~50%⊥ | <50%⊥ |
| 90:10 | 65.7 | ⊥ | ⊥ | ⊥ | ~70%⊥ | ~50%⊥ | ~50%⊥ | <50%⊥ |
| 80:20 | 67.1 | ⊥ | ⊥ | ⊥ | ⊥ | ⊥ | ~70%⊥ | <50%⊥ |
| 70:30 | 68.4 | ⊥ | ⊥ | ⊥ | ⊥ | ⊥ | ~70%⊥ | ~70%⊥ |
| 60:40 | 71.2 | ⊥ | ⊥ | ⊥ | ⊥ | ⊥ | ~90%⊥ | ~70%⊥ |

TABLE 2-continued

| EDCPDMA/ Styrene | CA | La 1% 1 min | La 1% 6 hr | La 2% 1 min | La 2% 6 hr | La 2% 18 hr | Cy 1% 1 min | Cy 1% 10 min |
|---|---|---|---|---|---|---|---|---|
| 50:50 | 73.6 | ⊥ | ⊥ | ⊥ | ⊥ | ⊥ | ~90%⊥ | ~70%⊥ |
| 40:60 | 78 | ⊥ | ⊥ | ⊥ | ⊥ | ⊥ | ⊥ | >90%⊥ |
| 30:70 | 78.3 | ⊥ | ⊥ | ⊥ | ⊥ | ⊥ | ⊥ | ⊥ |

Figure 8B:
Figure 8C:
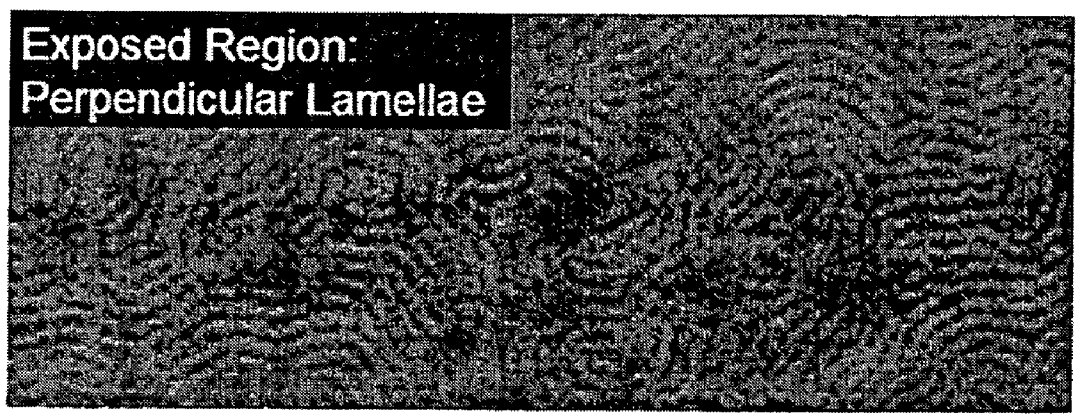

In a further example, as shown in FIG. 8B and FIG. 8C, the crosslinked orientation control layer was patterned by a photopatterning method to provide developed, orientation control layer-free regions on the substrate, and a lamellae-forming block copolymer as described hereinabove was coated on the substrate and processed as above. In the AFM image of FIG. 8B, it can be seen that the regions of the block copolymer layer disposed over the regions of the substrate free of the orientation control layer have parallel orientation of the lamellae. (i.e., no lamellar pattern is visible). In the AFM image of FIG. 8C, it can be seen that the regions of the block copolymer layer disposed over the regions of the substrate having the orientation control layer pattern have perpendicular orientation of the lamellae (i.e., the lamellar pattern is visible).

Figure 9B:
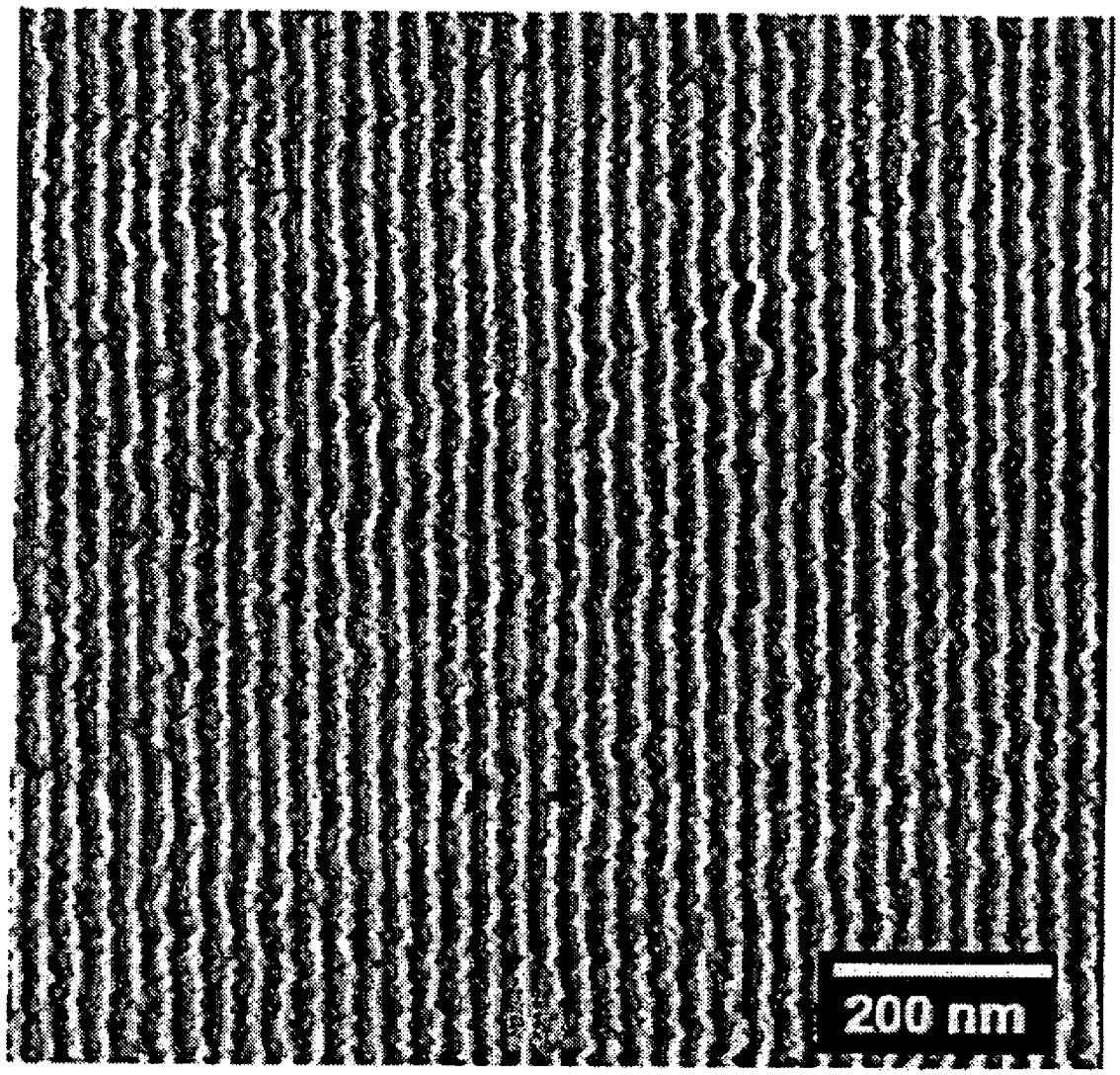

In a further example, as shown in FIG. 9B, the orientation control layer was patterned by direct write e-beam method, and a lamellac-forming block copolymer as described hereinabove was coated on the substrate and processed as above. In the AFM image of FIG. 9B, it can be seen that the pattern of lamellae formed in the block copolymer layer coincides with the pattern imaged by e-beam in the orientation control layer.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of controlling the orientation of microphase-separated domains in a block copolymer film, comprising:
    (a) forming an orientation control layer comprising an epoxy-containing cycloaliphatic acrylic polymer over a surface of a substrate,
    (b) irradiating and/or heating to crosslink the orientation control layer,
    (c) forming a block copolymer assembly layer comprising a block copolymer that forms microphase-separated domains upon forming the block copolymer assembly layer, on a surface of the orientation control layer opposite the substrate, and
    (d) removing at least one microphase-separated domain to generate a topographical pattern.

2. The method of claim 1, wherein forming the orientation control layer in (a) comprises:
    applying a first composition comprising the epoxy-containing cycloaliphatic acrylic polymer and a solvent on a surface of a substrate by a film deposition process.

3. The method of claim 2, wherein the applied epoxy-containing cycloaliphatic acrylic polymer is optionally baked at a temperature of 70 to 150° C. for at least 20 seconds.

4. The method of claim 2, wherein the first composition comprises:

a base polymer comprising Formula (1), Formula (2), or a combination comprising at least one of the foregoing base polymers,

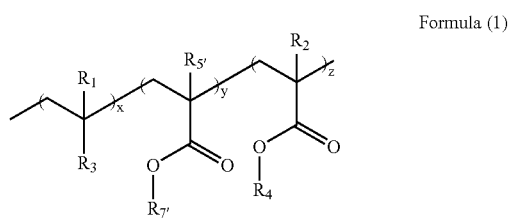

Formula (1)

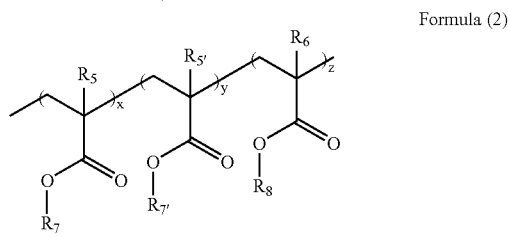

Formula (2)

wherein, in Formulas (1) and (2)
    $R_1$, $R_2$, $R_5$, $R_{5'}$ and $R_6$ are independently H, F, $CF_3$, or $CH_3$,
    $R_3$ is a substituted or unsubstituted phenyl, naphthyl, or anthracyl group,
    $R_4$ and $R_8$ are independently monocyclic or polycyclic $C_{6-12}$ epoxy-containing groups,
    $R_7$ and $R_{7'}$ are each independently a $C_{1-20}$ aromatic group or $C_{1-20}$ aliphatic group, and at least one of $R_5$ and $R_{5'}$, or $R_7$ and $R_{7'}$ are not identical; and
    in Formulas (1) and (2), x and y are independently 0 to 98%, z is 2 to 100%, the sum of monomer mole percentages x+y+z is at least 85%, and the ratio of the mole percentages of x+y to z is 0:100 to 98:2; and
an acid generator comprising a thermal acid generator, photoacid generator, or a combination of thermal acid generator and photoacid generator.

5. The method of claim 4, wherein the first composition further comprises an additive comprising a surfactant, a quencher, a hardener, a crosslinker, a chain extender, or a combination comprising at least one of the foregoing additives.

6. The method of claim 1, wherein in (b), heating comprises baking the substrate having the orientation control layer at a temperature of 100 to 250° C. for at least 30 seconds.

7. The method of claim 1, wherein the block copolymer comprises blocks comprising one or more monomers, at least two blocks in the block copolymer are compositionally non-identical, and the block copolymer is a diblock copolymer, triblock copolymer, or multiblock copolymer.

8. The method of claim 7, comprising baking the substrate having the block copolymer and orientation control layers is done: at a temperature of 70 to 150° C. for at least 20 seconds.

9. The method of claim 7, wherein the blocks comprise monomers comprising $C_{2-30}$ olefinic monomers, (meth)acrylate monomers derived from $C_{1-30}$ alcohols, or a combination comprising at least one of the foregoing monomers.

10. The method of claim 1, wherein forming the block copolymer assembly layer comprises:
   applying a second composition comprising the block copolymer and a casting solvent, to a surface of the orientation control layer opposite the substrate by a process comprising spin-casting, dip-coating, doctor blading, or spray dispense.

11. The method of claim 10, wherein the second composition comprises at least one additional component selected from the group consisting of
   homopolymers, copolymers, crosslinkable polymers;
   small molecules, surfactants, photoacid generations, thermal acid generators, quenchers, hardeners, cross-linkers, chain extenders, and a combination comprising at least one of the foregoing;
   wherein one or more of the additional components co-assemble with the microphase-separated domains of the block copolymer to form the block copolymer assembly layer.

12. The method of claim 1 wherein the orientation control layer is disposed on a surface of layered film stack comprising:
   a substrate, a pattern transfer layer disposed on a surface of the substrate, and a hardmask disposed on a surface of the pattern transfer layer,
   wherein the orientation control layer is in contact with an exposed surface of the hardmask.

13. The method of claim 12, further comprising pattern transfer from the topographical pattern in the block copolymer assembly layer to the orientation control layer by a reactive ion etch process to generate a topographic pattern in the orientation control layer, followed by pattern transfer from the patterned orientation control layer to the hardmask by a hardmask etch.

14. The method of claim 1, wherein the block copolymer of the block copolymer assembly layer comprises a block comprising inorganic-containing monomers comprising silicon-containing monomers, germanium-containing monomers, or metal-containing monomers; or wherein the block copolymer assembly layer comprises, in addition to the block copolymer, inorganic-containing polymers or inorganic-containing molecules which assemble with the block copolymer to form the microphase-separated domains of the block copolymer assembly layer.

15. The method of claim 1, further comprising after (b) and before (c):
   rinsing the orientation control layer with a solvent; and
   heating the substrate to remove residual solvent.

16. The method of claim 1, further comprising annealing the substrate to induce pattern formation in the block copolymer layer, wherein annealing the substrate is carried out at 80 to 300° C. for a time of 30 seconds to 48 hours.

17. The method of claim 5 wherein the thermal and/or photoacid generator is present in an amount of 0.01 to 10 wt % based on the total weight of the first composition, the additive is present in an amount of 0.01 to 10 wt % of the total weight of the first composition, and the total solids of the first composition comprising base polymer, thermal acid generator and/or photo-acid generator, and additive is 0.5 to 30 wt % based on the total weight of the first composition including casting solvent.

18. The method of claim 1, wherein the microphase-separated domains are cylindrical microphase-separated domains oriented perpendicular to the surface of the orientation control layer, or wherein the microphase-separated domains are lamellar domains oriented perpendicular to the surface of the orientation control layer.

19. The method of claim 1, further comprising pattern transfer from the topographic pattern in the block copolymer assembly layer to the substrate by a reactive ion etch process.

20. A method of controlling the orientation of microphase-separated domains in specific areas of a substrate coated with a block copolymer film, comprising:
   (a) forming an orientation control layer comprising an epoxy-containing cycloaliphatic acrylic polymer over a surface of a substrate,
   (b) exposing the orientation control layer pattern-wise with actinic radiation, EUV, or electron beam, to form a pattern of exposed and unexposed regions of the orientation control layer,
   (c) heating the substrate to crosslink the orientation control layer in the exposed regions,
   (d) removing uncrosslinked orientation control layer material in the unexposed regions with a solvent to uncover the surface of the substrate in the unexposed regions,
   (e) optionally, heating the substrate having the patterned crosslinked orientation control layer to remove residual solvent,
   (f) forming a block copolymer assembly layer comprising a block copolymer that forms microphase-separated domains, on a surface of the patterned crosslinked orientation control layer opposite the substrate, and
   (g) optionally, annealing the substrate to induce pattern formation in the block copolymer layer,
   wherein lamellae form perpendicular to the plane of the substrate over the crosslinked orientation control layer, and wherein lamellae form parallel to the plane of the substrate over the uncovered surface of the substrate.

21. The method of claim 20, further comprising removing at least one microphase-separated domain to generate a topographical pattern, followed by pattern transfer from the topographic pattern to the substrate by a reactive ion etch process.

22. A method of controlling the orientation of microphase-separated domains and the directional alignment of the microphase-separated domains in a block copolymer film, comprising:
   (a) forming an orientation control layer comprising an epoxy-containing cycloaliphatic acrylic polymer over a surface of a substrate,
   (b) heating the substrate to crosslink the orientation control layer,
   (c) optionally, rinsing the orientation control layer with a solvent,
   (d) optionally, heating the substrate to remove residual solvent,
   (e) exposing the orientation control layer pattern-wise with actinic radiation, EUV, x-ray, or electron beam, to form a pattern of exposed and unexposed regions of the orientation control layer,
   (f) optionally, rinsing the patterned orientation control layer with a solvent,
   (g) optionally, heating the substrate having the patterned orientation control layer to remove residual solvent,
   (h) forming a block copolymer assembly layer comprising a block copolymer having at least one block that forms microphase-separated domains on a surface of the patterned orientation control layer opposite the substrate, and
   (i) annealing the substrate to induce microphase-separated domains to form a pattern in the block copolymer layer, wherein the microphase-separated domains are lamellae, and wherein when a pitch of the pattern in the patterned orientation control layer is at least 200% larger than the pitch of lamellae, the lamellae form parallel to the plane of the substrate over the exposed region of the patterned orientation control layer, and form perpendicular to the plane of the substrate on the unexposed region of patterned orientation control layer.

23. The method of claim 22, further comprising removing at least one microphase-separated domain to generate a topographical pattern, followed by pattern transfer from the topographic pattern to the substrate by a reactive ion etch process.

24. A method of controlling the orientation of microphase-separated domains and the directional alignment of the microphase-separated domains in a block copolymer film, comprising:
  (a) forming an orientation control layer comprising an epoxy-containing cycloaliphatic acrylic polymer over a surface of a substrate,
  (b) heating the substrate to crosslink the orientation control layer,
  (c) optionally, rinsing the orientation control layer with a solvent,
  (d) optionally, heating the substrate to remove residual solvent
  (e) exposing the orientation control layer pattern-wise with actinic radiation, EUV, x-ray, or electron beam, to form a pattern of exposed and unexposed regions of the orientation control layer,
  (f) optionally, rinsing the patterned orientation control layer with a solvent,
  (g) optionally, heating the substrate having the patterned orientation control layer to remove residual solvent,
  (h) forming a block copolymer assembly layer comprising a block copolymer having at least one block that forms microphase-separated domains on a surface of the patterned orientation control layer opposite the substrate, and
  (i) annealing the substrate to induce microphase-separated domains to form a pattern in the block copolymer layer, wherein the microphase-separated domains are lamellac, and wherein when a pitch of the pattern in the patterned orientation control layer is about the same as a pitch of the pattern in the block copolymer layer, the exposed region is wetted by one domain of the block copolymer and the unexposed region is wetted by the other domain(s) of block copolymer, and the block copolymer forms a spatial replica of the underlying patterned orientation control layer.

25. The method of claim 24, further comprising removing at least one microphase-separated domain to generate a topographical pattern, followed by pattern transfer from the topographic pattern to the substrate by a reactive ion etch process.

* * * * *